US008387948B2

(12) United States Patent
Kuehl et al.

(10) Patent No.: US 8,387,948 B2
(45) Date of Patent: Mar. 5, 2013

(54) MECHANICALLY ENERGIZED SUBSTANCE COMMUNICATION COUPLING SYSTEM

(75) Inventors: Steven J. Kuehl, Stevensville, MI (US); Richard A. McCoy, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 503 days.

(21) Appl. No.: 12/643,217

(22) Filed: Dec. 21, 2009

(65) Prior Publication Data

US 2011/0149485 A1 Jun. 23, 2011

(51) Int. Cl.

*F16L 37/38* (2006.01)
*H01R 4/60* (2006.01)
*B65B 1/04* (2006.01)

(52) U.S. Cl. ........ 251/149; 141/347; 141/349; 141/351; 439/190

(58) Field of Classification Search .................. 251/149, 251/142; 141/349, 351, 198, 192, 347; 200/52 R, 200/61.58 R, 61.6, 61.85, 61.86, 51 R; 439/190
See application file for complete search history.

(56) References Cited

U.S. PATENT DOCUMENTS 1,958,206 A 5/1934 Rubsam
3,101,984 A 8/1963 Wieckmann
3,258,553 A 6/1966 Breslin
4,148,536 A 4/1979 Petropoulsos et al.
4,591,732 A 5/1986 Neuenschwander
4,604,505 A 8/1986 Henninger
5,031,258 A 7/1991 Shaw
5,385,468 A 1/1995 Verderber
5,433,623 A 7/1995 Wakata et al.
5,713,752 A 2/1998 Leong et al.
6,176,718 B1 1/2001 Skarie et al.
6,350,148 B1 2/2002 Bartolutti et al.
6,359,270 B1 3/2002 Bridson
6,428,334 B1 8/2002 Skarie et al.
6,534,951 B2 3/2003 Kawashima
6,559,882 B1 5/2003 Kerchner
6,685,491 B2 2/2004 Gergek
6,969,928 B2 11/2005 Hanson
6,981,695 B1 1/2006 Hedlund et al.
7,024,717 B2 4/2006 Hilscher et al.
7,207,080 B2 4/2007 Hilscher et al.
7,209,038 B1 4/2007 Deconinck et al.
7,264,026 B2 9/2007 Gruber et al.
7,291,032 B1 11/2007 Carver et al.
7,354,292 B1 4/2008 Lloyd et al.

(Continued)

FOREIGN PATENT DOCUMENTS

EP 0868077 A2 9/1998
JP 60033716 A 2/1985

(Continued)

*Primary Examiner* — Eric Keasel
*Assistant Examiner* — David Colon Morales
(74) *Attorney, Agent, or Firm* — Clifton G. Green; McGarry Bair PC

(57) ABSTRACT

A system for communicating a substance from between substance communicating devices. A substance switch is provided for selectively transferring the substance from a first substance communicating device, such as a host or other substance source to a first substance communicating device, such as a such as a substance consumer. The substance switch is activated to communicate the substance between the first substance communicating device and the second substance communicating device in response to movement of a component associated with one of the substance communicating devices.

39 Claims, 13 Drawing Sheets

186 180 174 112 170 166 168 180 164 178 104 142 172 176 174 190 144 110 192 182 134 154 114 158 132 152 184 102 184 160 140 130 148 154 118 156 146 128 146 150 116 120 136 124

U.S. PATENT DOCUMENTS 7,404,298 B2 7/2008 Kim et al.
7,493,926 B2 2/2009 Weglin
7,584,030 B1 9/2009 Graham
7,618,295 B2 11/2009 McCoy
7,625,246 B2 12/2009 McCoy et al.
7,639,485 B2 12/2009 McCoy
7,651,368 B2 1/2010 Kendall et al.
7,686,127 B2 3/2010 LeClear et al.
7,713,090 B2 5/2010 Kendall et al.
7,740,505 B2 6/2010 McCoy
7,740,506 B2 6/2010 McCoy
7,748,494 B2 7/2010 Leclear et al.
7,751,184 B2 7/2010 McCoy
7,765,332 B2 7/2010 McCoy et al.
7,798,865 B2 9/2010 McCoy et al.
7,810,343 B2 10/2010 McCoy et al.
7,826,203 B2 11/2010 McCoy
7,841,907 B2 11/2010 McCoy
7,843,697 B2 11/2010 McCoy et al.
7,852,619 B2 12/2010 McCoy
7,865,639 B2 1/2011 McCoy et al.
7,869,201 B2 1/2011 McCoy et al.
7,870,753 B2 1/2011 Marcy, V et al.
7,871,300 B2 1/2011 McCoy et al.
7,898,812 B2 3/2011 McCoy et al.
7,903,397 B2 3/2011 McCoy
7,916,336 B2 3/2011 Silverbrook et al.
7,931,114 B2 4/2011 Leclear et al.
7,934,958 B2 5/2011 Kendall et al.
7,980,088 B2 7/2011 Leclear et al.
8,008,586 B2 8/2011 Kuehl et al.
8,035,958 B2 10/2011 Kendall et al.
8,040,666 B2 10/2011 Mccoy et al.
8,151,016 B2 * 4/2012 Mccoy ............................ 710/33
2003/0037447 A1 * 2/2003 Gruber et al. .................. 30/537
2003/0154338 A1 8/2003 Boz et al.
2004/0036273 A1 2/2004 McClary
2004/0154318 A1 8/2004 Roh et al.
2005/0011205 A1 1/2005 Holmes et al.
2006/0053655 A1 * 3/2006 Weglin ............................ 36/3 B
2006/0118694 A1 6/2006 Lee et al.
2006/0125360 A1 6/2006 Kim et al.
2006/0168236 A1 7/2006 Higuma et al.
2007/0086151 A1 4/2007 Oh et al.
2008/0065289 A1 3/2008 Bertosa et al.
2008/0164224 A1 7/2008 McCoy et al.
2008/0164225 A1 7/2008 McCoy
2008/0164226 A1 7/2008 McCoy et al.
2008/0164227 A1 7/2008 LeClear et al.
2008/0164796 A1 7/2008 McCoy et al.
2008/0165282 A1 7/2008 Marcy et al.
2008/0165474 A1 7/2008 McCoy et al.
2008/0165475 A1 7/2008 McCoy et al.
2008/0165476 A1 7/2008 McCoy et al.
2008/0165478 A1 7/2008 McCoy
2008/0165505 A1 7/2008 McCoy et al.
2008/0165509 A1 7/2008 Kendall et al.
2008/0165998 A1 7/2008 LeClear et al.
2008/0166895 A1 7/2008 McCoy et al.
2008/0166915 A1 7/2008 Kendall et al.
2008/0168205 A1 7/2008 McCoy et al.
2008/0192411 A1 8/2008 McCoy
2008/0201032 A1 8/2008 Fayyad et al.
2008/0222327 A1 9/2008 McCoy et al.
2008/0231464 A1 9/2008 Lewis et al.
2008/0231764 A1 9/2008 Kendall et al.
2008/0232053 A1 9/2008 Kendall et al.
2008/0247141 A1 10/2008 Kendall et al.
2008/0287009 A1 11/2008 McCoy
2009/0009316 A1 1/2009 Kendall et al.
2009/0047824 A1 2/2009 Seibert et al.
2009/0054804 A1 2/2009 Gharib et al.
2010/0120284 A1 5/2010 Oka et al.
2010/0182753 A1 7/2010 Kendall et al.
2010/0248546 A1 9/2010 McCoy
2011/0049308 A1 3/2011 Beaman et al.
2011/0146328 A1 6/2011 Hendrickson et al.
2011/0146329 A1 6/2011 Kuehl et al.
2011/0146330 A1 6/2011 Kuehl et al.
2011/0146819 A1 6/2011 Hendrickson et al.
2011/0147159 A1 6/2011 Kuehl et al.
2011/0147160 A1 6/2011 Kuehl et al.
2011/0147161 A1 6/2011 Kuehl et al.
2011/0147417 A1 6/2011 Kuehl
2011/0148216 A1 6/2011 McCoy
2011/0148223 A1 6/2011 McCoy
2011/0148649 A1 6/2011 de Cavalcanti et al.
2011/0148650 A1 6/2011 Jenkins et al.
2011/0148651 A1 6/2011 Hendrickson et al.
2011/0149485 A1 6/2011 Kuehl et al.
2011/0152024 A1 6/2011 Kuehl
2011/0153739 A1 6/2011 McCoy
2011/0153821 A1 6/2011 McCoy
2011/0153871 A1 6/2011 Ferragut, II et al.
2011/0153880 A1 6/2011 McCoy

FOREIGN PATENT DOCUMENTS

JP 06310202 A 11/1994
JP 06310204 A 11/1994
JP 06333633 A 12/1994
JP 2007080584 A 3/2007
WO 2007/015274 A1 2/2007

* cited by examiner

MECHANICALLY ENERGIZED SUBSTANCE COMMUNICATION COUPLING SYSTEM

BACKGROUND

Appliances and other useful household equipment are increasingly designed to interact with one another, as well as with a variety of consumer accessory devices. A consumer accessory device may be used, for example, in conjunction with an appliance to enhance or supplement the functionality of the appliance.

BRIEF SUMMARY

The invention relates to substance communication coupling systems for connecting substance communicating devices, such as coupling portable devices to a host, and more particularly to systems for communicating a substance from between substance communicating devices.

According to one aspect of the invention, a substance communication coupling system comprises a first connector component, a substance switch operably connected to a substance source, the substance switch operable for selectively transferring a substance from a substance source to the first service connector component, the substance switch including a first link moveably associated with the substance switch, and a second connector component operably connectable to the first connector component, the second connector component including a second link associated with the second connector component and engageable with the first link of the substance switch, wherein the substance switch is selectively activated to transfer a substance from the first connector component to the second connector component in response to movement of the first link when engaged with the second link.

According to another aspect of the invention, a system communicates with a substance source. The system comprises a first connector component operably engageable with a separate second connector component for transferring a substance from a substance source to the second connector component, and a substance switch for selectively permitting the flow of substance between the first and second connector components, the substance switch including a first link engageable with a second link associated with the second connector component, wherein the substance switch is activated to transfer a substance from the substance source to the first connector component in response to movement of the first link.

According to yet another aspect of the invention, a system receives a substance from a host comprising a substance source. The system comprises a second connector component operably engageable with a separate first connector component for selectively receiving a substance from the substance source, and an actuator operably associated with the second connector component, the actuator moveable along a path generally parallel to an axis of insertion of the second connector component with the first connector component, between a first position and a second position, wherein the substance is delivered to the second connector component when the actuator is in the first position.

According to still another aspect of the invention, an adapter removably couples an accessory device having a first device substance communication connector component to a host having a substance provider, a first host substance communication connector component, and a substance switch selectively providing a substance to the first device substance communication connector component. The adapter comprises a second host substance communication connector component engageable with the first host substance communication connector component, a second device substance communication connector component engageable with the first device substance communication connector component, a substance communication line operably interconnecting the second host substance communication connector component and the second device substance communication connector component for the transfer of a substance there along, and a first link engageable with a second link associated with the substance switch, wherein the substance switch is activated in response to movement of the first link.

DETAILED DESCRIPTION

Figure 1:
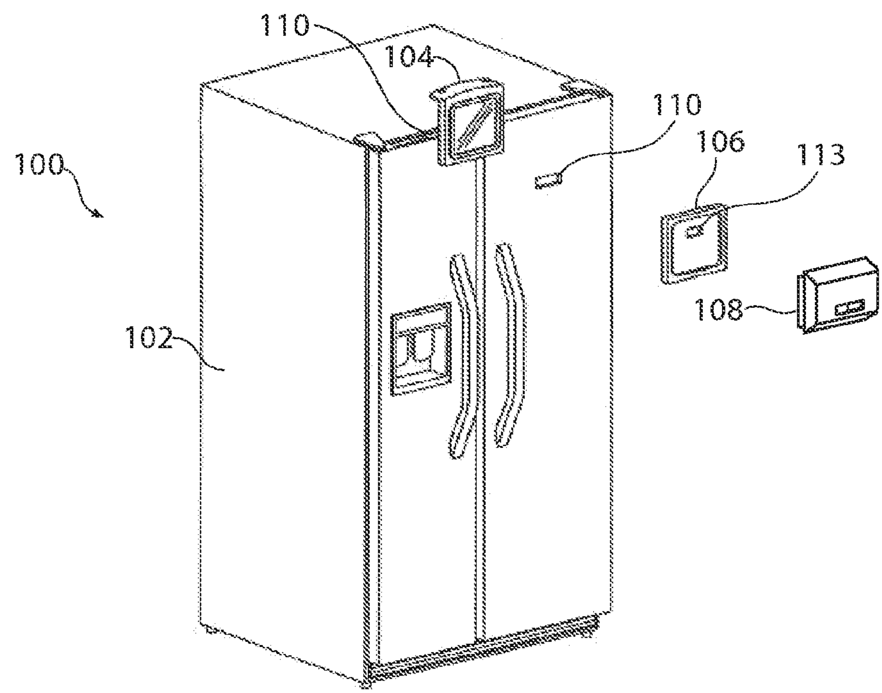
FIG. 1 is a perspective view of a modular system according to a first embodiment of the invention employing a mechanically energized substance communication coupling system for connecting a portable device to a host.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or to otherwise limit or restrict the claims to the precise forms and configurations shown in the drawings and disclosed in the following detailed description.

The drawings and the following detailed description relate generally to systems of substance communication coupling systems for coupling a substance provider with a substance consumer. The following definitions apply to terms that may be used in the specification and the claims, unless otherwise noted.

As used herein, a "substance" is a material that may be communicated from one device to another. A substance may include a gas, a liquid, or a solid, or any combination thereof. Examples of substances include, but are not limited to, liquid soap, powdered soap, compressed air, tablets, caplets, water, ice cubes, and a beverage.

As used herein, "substance communication" or a "substance communication service" is a useful provision of a substance from one device to another device. Communicating a substance includes supplying or receiving a substance. As used herein, communication of substance includes both unidirectional and multi-directional communication between any two devices, either directly or through an adapter, as defined herein. Substance communication may be provided in quanta, such as capsules or other doses of substances, batches of discrete items such as tablets, or consumable components.

The terms "provide" and "supply" and any variation thereof, are used herein to denote a source of the substance relative to a device receiving the substance. Neither term is limited to the original source of the substance. A device that provides or supplies the substance may simply be passing on the substance from the original source. For example, a device that provides water may pass on water it receives from a residential water supply. However, the device may alternatively or additionally provide another substance that originates with the device, such as an additive stored in a reservoir.

The term "receive" and any variation thereof, is used herein to denote receipt of the substance relative to the device providing the substance. The term not limited to the ultimate consumer of the substance. A device that receives a substance may simply be passing on the substance from the source, such as an appliance, to a device that will consume, as hereinafter defined, the substance. The device which receives a substance is not necessarily the end consumer of the substance.

The term "consume" and any variation thereof, as used herein, denotes the act of employing or dispensing at least a portion of the substance received in connection with performing a function.

The term "consumable" and any variation thereof, as used herein, includes any substance that may be consumed by a host, an accessory device, or a user person, such as food, cosmetics, or medicine. The consumable may, for example, be a substance that is used up and must be replenished for subsequent cycles of operation. For a clothes washer, the consumable might be a detergent and/or a softener. For a clothes dryer, the consumable might be an anti-static cloth. For a cooking or refrigeration appliance, the consumable may actually be the article on which the appliance performs its cycle of operation, as in the case of food, later to be consumed by a person. More specific examples of the use of a consumable in appliances include dispensing additives for clothes washers, clothes dryers, or combination washer/dryer appliances. The additives can include, but are not limited to, normal detergents, gentle detergents, dark clothing detergents, cold water detergents, fabric softeners, chlorine bleaches, color-safe bleaches, and fabric enhancement chemistry. Non-limiting examples of fabric enhancers are additives to provide stain resistance, wrinkle resistance, water repellency, insect repellency, color fastness, fragrances, and anti-microbials. Another example of a consumable is the filters used by an appliance. Refrigerators, dryers, washers, and dishwashers are all known to use filters that are consumed in the sense that they wear out and must be replaced.

The term "coupled" and any variation thereof, as used herein, includes any type of connection that permits transfer of a substance between two devices. The term "coupled" does not require a physical connection between the two devices, so long as the coupling permits transfer of a substance. The term "coupled" includes both fixed and removable coupling, as well as both continuous and intermittent coupling.

A "service connector system" is a connector system having at least two separate service connector components, also referred to as service couplers, each associated with a useful device. The service connector components cooperate with one another to couple the useful devices to facilitate communication of a service between the useful devices. A service connector system may carry multiple services. An electromagnetic service connector system, for example, may be associated with or incorporated into a substance connector system or may be independent of a substance connector system but be associated with the same substance holder, substance provider or substance consumer.

The term "useful device" and any variation thereof, as used herein, is a device that is capable of performing a useful physical or virtual function either alone or in combination with another device.

The term "substance consumer" and any variation thereof, as used herein, is any useful device that employs, uses stores, or dispenses a substance in connection with performing a physical or virtual function. A substance consumer may be, for example, a smart utensil, an appliance, a resource controller, such as a water controller, a dispenser, a filter, a water filter, an air filter, a detergent dispenser, a drink dispenser, a detergent cartridge, and a substance holder, such as a bottle, a jug, or a cycle accessory.

The term "substance provider" and any variation thereof, as used herein, is any device that is capable of providing or supplying a substance to another device.

A "substance communicating device" is any substance holder, substance provider, or substance consumer which is capable of communicating substance with another device.

A "substance communicating system" is any combination of substance communicating devices capable of communicating a substance therebetween.

As used herein, the term "substance holder" is anything that holds or contains a substance, which may include, but is not limited to, a container, a dispenser, a cartridge, a dish, a bag, or a carton.

As used herein, the term "consumable holder" is any substance holder that holds or contains a consumable.

As used herein, the term "host" is an apparatus that has a primary function independent of providing or receiving a substance. A host may be a substance provider, a substance consumer, or both. For example, the host may be an appliance and the primary function can be performing a series of steps to conduct a useful cycle of operation. The appliance may be a conventional household appliance, such as a refrigerator performing a cooling cycle or an ice making cycle. Other examples of appliances that may be hosts include, but are not limited to, a freezer, a conventional oven, a microwave oven, a dishwashing machine, a stove, a range, an air conditioner, a dehumidifier, a clothes washing machine, a clothes dryer, a clothes refreshing machine, and a non-aqueous washing apparatus, or any combination thereof. Alternatively, the host may be a fixture such as a water softener, a water heater, a furnace, pool water treatment equipment, or an HVAC system. The host may be a small device such as a thermostat, a blender, a mixer, a toaster, a coffee maker, a trash compactor, an air purifier, an iron, a vacuum cleaner, or a robot. The host may alternatively comprise a structural feature of a building, such as a wall, a cabinet, or a door. The host may also provide other services, such as electrical power, electronic data, mechanical power, illumination, heat, or sound.

As used herein, the terms "accessory" or an "accessory device" refer to any useful device which may be coupled to a host and communicate a substance to or from the host. An accessory device may be used primarily in conjunction with a host to enhance, supplement, regulate, or monitor the functionality of the host or may have independent functionality and utility. An accessory device may be a substance provider, a substance consumer, or both. An accessory device may be a substance holder or a consumable holder. Examples of an accessory device include, but are not limited to, a paper product dispenser, a dry goods dispenser, a bottle opener, a liquid dispenser, a pill dispenser, a water dispenser, a fan, a motor, a tissue dispenser, a can opener, a mixer, a blender, an ice dispenser, an ice maker, an ice cream maker, a coffee maker, a soap dispenser, and a softener dispenser. An accessory or accessory device may also communicate electromagnetic service with the host.

As used herein, the term "portable device" is an accessory device that is designed to be moveable by a user during its useful life between a use location and a storage location or alternative use location.

As used herein, the term "independent device" is a useful device that provides a useful function without being connected to a substance provider. In some cases the primary function of the independent device is different from the primary function of a host from which the independent device may receive a substance. The independent device may be an accessory device.

As used herein, the term "dependent device" is a useful device that provides a useful function only when connected to a substance provider. A dependent device may be a substance consumer. Examples of a dependent device that may be coupled to a host include, but are not limited to, a smart pan or pot, an ice maker, and a bulk detergent dispenser.

As used herein, the term "substance communication coupling system" or "substance connector system" refers to any connector system having at least two separate substance communicating connector components, each of which is associated with a useful device. The substance communicating connector components cooperate with one another to couple the useful devices to facilitate communication of a substance between the useful devices.

As used herein, the term "switched substance communication coupling system" is a substance communication coupling system having switching or valving capability in at least one of the substance communicating connector components operable to selectively control the communication of a substance between the components of the substance communication coupling system.

As used herein, the term "substance switch" is any component used to selectively regulate the communication of a substance between components of a substance communication coupling system, such as switches, valves, pumps, fans, and controllers for controlling such devices. A substance switch may be associated with more than one type of service. For example, a substance switch may be associated with, integrated with, or comprise an electromagnetic switch or may be independent of the electromagnetic switch.

As used herein, the term "switching valve" is any valve used to selectively facilitate the communication of a substance between components of a substance communication coupling system.

"Wireless" refers to a type of communication in which power and/or data is transferred over a distance without the use of electrical conductors or wires. For example, electromagnetic waves, light waves, or acoustic waves can be used to carry power and/or data over a distance without using electrical conductors or wires.

A "proximity target" as used herein is any component or device that may be detected when positioned within a predetermined distance of an associated proximity sensor, defined below. A proximity target may be passive, such as a visual target or a magnetic target formed of magnetic or magnetic responsive material. Other examples of passive proximity targets may include a conductive component or surface capable of cooperating with a magnetic field, a current, or a voltage provided by a proximity sensor. A proximity target may alternatively be active or powered such as an electromagnet, a generator of a magnetic field, a current, a voltage or an acoustic wave. An active proximity target may alternatively provide a powered readable display or dispense a detectable chemical.

A "proximity sensor" is any component or device which may detect an associated proximity target when the proximity target is within a range of the proximity sensor. A proximity sensor may detect, for example, a change in an electromagnetic field, an electromagnetic wave, an acoustic wave, a visual target, a chemical component, an electrical signal, a change in voltage, a change in current, a change in frequency, a change in resistance, a change in inductance, a change in capacitance, a mechanical signal, a change in pressure, a displacement, a vibration, and the presence of a chemical. A proximity sensor may be active or passive, such as a magnetic sensor of magnetic or magnet responsive material, or may alternatively be active. Examples of active sensors include active magnetic sensors, light sensors, optical sensors, acoustic sensors, electromagnetic sensors, chemical sensors and thermal sensors. Examples of magnetic sensors include magnets and magnetic responsive components. Examples of optical sensors include infrared sensors, photoelectric sensors, fiber optic sensors, photo resistors, photovoltaic sensors, photo diodes and cameras. Examples of electromagnetic sensors include radio receivers, radar sensors, Hall Effect sensors, inductive sensors, capacitive sensors, variable reluctance sensors and eddy current sensors. Examples of acoustic sensors include ultrasonic sensors and microphones. Examples of chemical sensors include pH change strips in conjunction with optical sensors, reactants that change an electrical circuit resistance or conductivity, reactants that cause increase in hydraulic pressure. Examples of thermal sensors include thermocouples, thermistors, bi-metal thermostats, diaphragm thermostats, color changing surfaces. A contact proximity sensor detects a proximity target by touching the proximity target. A contactless proximity sensor detects the target through a wireless or contactless means. For example, magnetic flux can be used as the signaling mechanism between a contactless proximity sensor and a contactless proximity target.

As used herein, the term "proximity system" is a system that uses a "proximity switch" operated by a plurality of "proximity coupling components," each associated with a different parent device, for determining that the parent devices are in proximity with each other. Parent devices are usually paired, examples of which include a service provide and a service consumer, a host and an accessory, and a host and an adapter. Proximity coupling components may include a proximity target associated with one parent device to actively or passively provide an indication of the presence of the one parent device and a proximity sensor associated with the other parent device that is responsive to the presence of the proximity target to activate the proximity switch. The proximity switch may be used to provide a signal or message indicative of the proximity of two parent devices or may directly or indirectly regulate the flow of a service along a service line. The systems disclosed herein employ contact proximity systems, wherein the proximity target and proximity switch use physical contact to detect the proximity of the two parent devices.

As used herein, the term "plug" is a generally male substance connection component.

As used herein, the term "receptacle" is a generally female substance connection component.

As used herein, the terms "substance line" or "substance pathway" refer to a pathway for transferring a substance from one location to another. The substance line may have any of a variety of configurations depending on the type of substance being transferred, including, but not limited to, a pipe, a conduit, a tube, a channel, or fludically-aligned supply and receiver ports with a gap therebetween.

As used herein, the term "adapter" is an intermediate device that may be provided between a first and second useful device, such as between a host and an accessory, to facilitate the communication of substances between the first and second useful devices. An adapter may receive a substance from the first useful device and provide the substance or a modified version of the substance to the second useful device, for example, by providing a substance dispensing through a metering process, by processing the substance, or by combining the substance with an additive. In some applications, multiple adapters may be interposed between two useful devices. In other applications, three or more useful devices may be coupled to a single adapter, such as multiple accessories for a host. In some applications, the adapter may itself be a useful device providing a useful function not provided by the other useful device or devices coupled to it. An adapter may optionally include a transformative component that transforms a service from a service provider to a different service, which is supplied to a service consumer. This may be useful when the service from the service provider is not compatible with the service consumer. The transformative component can be configured to transform the service into a compatible form for the service consumer. Examples of transformative components are protocol converters, power transformers, or other devices that convert substance, energy, or data from a first form to a second form.

As used herein, the term "functional unit" is the combination of any adapter coupled to an accessory, which together provide functionality that neither the adapter nor the accessory can alone provide. Any functional unit itself is also included within the meaning of the term "useful device". In some cases, it is contemplated that a dependent device may be coupled with an adapter that provides one or more services required by the dependent device to enable the functional unit to provide a useful function, in which case the functional unit also constitutes an independent device.

Figure 2:
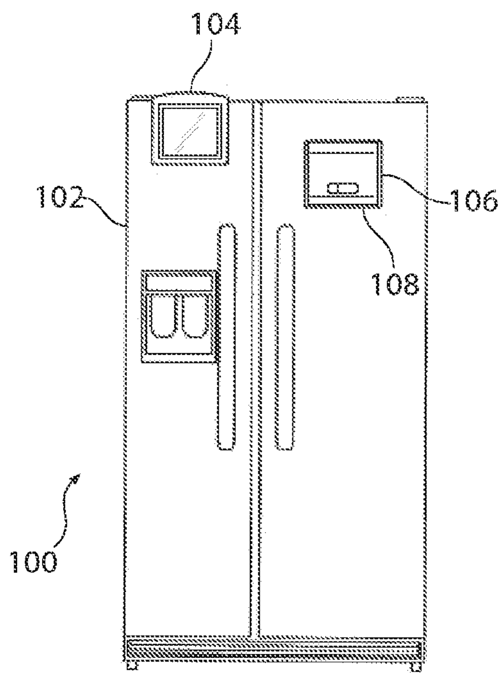
FIG. 2 is a front elevational view of the modular system of FIG. 1 showing the portable device attached to the host.
Figure 3:
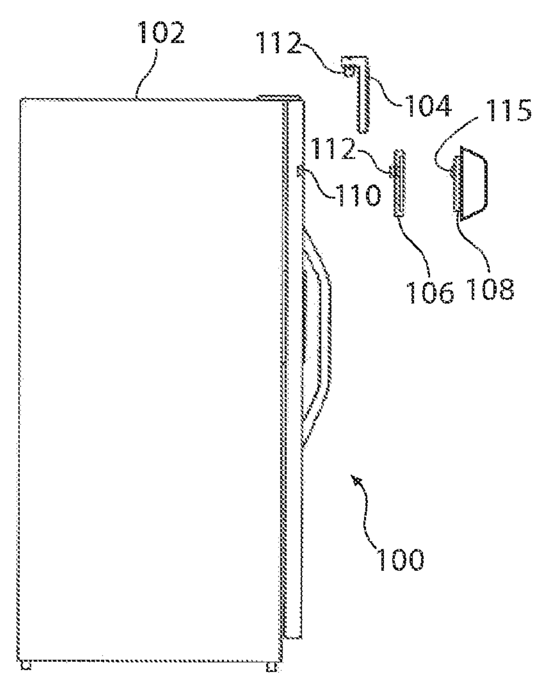
FIG. 3 is a side elevational view of the modular system of FIG. 1 showing the portable device removed from the host.

Referring now to FIGS. 1-3, a schematic illustration of a modular system 100 according to a first embodiment of the invention is shown to include at least one host 102 and at least one portable device 104, shown only schematically, that can be coupled to host 102. Both the host 102 and the accessory device 104 are substance communicating devices, and the host 102 may be a substance provider, and the accessory device 104 may be a substance consumer.

Portable device 104 may be either directly or indirectly coupled to host 102. Direct coupling occurs when portable device 104 includes a substance communication coupling system suitably configured for engaging a corresponding substance communication coupling system of host 102 to establish a substance pathway, described later herein, between the host 102 and the portable device 104. The substance pathway provides a conduit for transferring at least one substance from host 102 to portable device 104 and from portable device 104 to host 102.

An adapter 106 can be provided for coupling an accessory device 108 having an incompatible substance communication coupling system to host 102. A substance communication coupling system is incompatible if it cannot be directly coupled to a corresponding substance communication coupling system, such as when the incompatible substance communication coupling system lacks certain physical features that would enable the substance communication coupling system to engage the corresponding coupler to establish a substance pathway. Adapter 106 may include a substance communication coupling system that can be directly coupled with the substance communication coupling system of host 102 and a second substance communication coupling system that can be directly coupled with the incompatible substance communication coupling system of accessory device 108, thereby establishing a substance pathway between host 102 and accessory device 108.

Although portable device 104 is shown coupled to an upper surface of host 102, whereas accessory device 108 is shown attached to a front surface of host 102 by way of adapter 106, it shall be appreciated that in practice, portable device 104 and adapter 106 may be suitably configured for coupling to host 102 in any desired location and manner in order to accommodate the design and performance requirements of a particular application, such as on any surface on the exterior or interior of an appliance.

Host 102 may perform a primary function. As illustrated herein, host 102 is a refrigerator performing a cooling cycle and/or an ice making cycle. Although the figures show an appliance comprising a refrigerator, it shall be understood that the invention is not limited to refrigerators or appliances in general.

Portable device 104 and accessory device 108 may also perform at least one primary function. The primary functions of portable device 104 and accessory device 108 can be different from the primary function performed by host 102, although they need not be.

Host 102 can be configured to communicate at least one substance to or from portable device 104 and accessory device 108. Similarly, portable devices 104 and 108 may also be configured to communicate at least one substance to or from host 102. It is not necessary that the substance transferred between host 102 and portable devices 104 and 108 be used in performing the primary function of host 102 or portable devices 104 and 108, or otherwise be related to the primary function of either device.

As mentioned previously, in instances where the accessory device includes an incompatible substance communication coupling system that prevents direct coupling of the accessory device to host 102, adapter 106 may be provided for indirectly coupling the accessory device to host 102. Adapter 106 operates to establish a substance pathway for transferring the desired substance between host 102 and accessory device 108 having the incompatible substance communication coupling system.

At least one substance can be supplied to portable device 104 and accessory device 108 from host 102, or from portable devices 104 and 108 to host 102. The supply of the substance can be uni-directional in that either host 102 supplies the substance to portable devices 104 and 108 or portable devices 104 and 108 supply the substance to host 102. The supply of the substance can also be bi-directional in that the supplied substance can be delivered from host 102 to portable devices 104 and 108 and from portable devices 104 and 108 to host 102.

Substances that can be transferred between host 102 and devices 104 and 108 may include any fluid, liquid, gas, powder, and/or solid. Liquid communication may include, for example, the transfer of a liquid, such as water, hydraulic fluid, or primary or secondary cooling fluid, among others, between host 102 and devices 104 and 108. Gaseous communication may include, for example, the transfer of a gas, such as compressed air, water vapor, heated air, or cooled air, between host 102 and devices 104 and 108. For example, host 102 may provide a supply of pressurized air to devices 104 and 108. Solid communication may include the transfer a solid material, such as a powder, tablets, or pellets, to name a few. Host 102 may be operating as a conduit for transferring a substance received from an outside source, such as community water supply. It shall be appreciated that these are only a few examples of the various types of substances that can be transferred between host 102 and devices 104 and 108.

As illustrated, the accessory device 108 is a medicine module. The module may provide convenient access and consumer visibility to a supply of medicine for a consumer and allow control of temperature and humidity independently of the host 102 by the use of a secondary coolant communicated from the host 102, or alternatively by treated air supplied by the host 102.

It will further be appreciated that, while the embodiments in the drawings illustrate specific types of substance communicating devices, such as a host 102 that may operate as a substance provider, a portable device 104 that may operate as a substance consumer, and an adapter 106 that may act as a conduit for the transfer of substance from host 102 to accessory device 108, variations from this configuration are possible. These variations include systems with only two substance communicating devices, systems with more than three substance communicating devices, systems where any of the devices may be substance consumers and/or substance providers, systems where multiple substances or other services are communicated, and systems where substances are received by one device, converted in some manner, and then passed to a third device. Furthermore, in the following description, certain components of connector systems and proximity systems are described for the illustrative purposes as being associated with specific substance communicating devices. For example, a proximity switch, target or sensor may be described as being located in an exemplary substance provider, substance consumer, host, or portable device. It will be appreciated that these system components may be alternatively assigned to the various substance communicating devices depending on the application.

Host 102 and portable device 104 may each comprise at least one substance communication connector component, respectively referred to herein as a host substance communication connector component 110 and a device substance communication connector component 112. Host substance communication connector component 110 and device substance communication connector component 112 have complementary configurations that enable the substance communication coupling systems to be coupled to one another, thereby establishing a substance pathway over which desired substances can be transferred between host 102 and portable device 104.

Host 102 also has a second substance communication connector component 110 provided on its front surface for a first device substance communication connector component 112 provided on the adapter 106. In instances where accessory device 108 includes an incompatible substance communication coupling system and an adapter 106 is used as an intermediate component to connect accessory device 108 to modular system 100, adapter 106 may include a second device substance communication connector component 113 for engagement with a device substance communication connector component 115 of accessory device 108. Therefore, device substance communication connector components 112 may have the same general configuration whether included as part of device 104 or as a part of adapter 106. Similarly, the host communication connector components 110 may have the same general configuration whether included as part of host 12 or as part of adapter 106. Accordingly, for purposes of discussion, the various features and operation of host and device substance communication connector components 110 and 112 will hereinafter be described in connection with host 102 and portable device 104, but it shall be appreciated that substance communication connector components 110 and 112 may also be used in conjunction with adapter 106 or directly with accessory device 108.

Host substance communication connector component 110 can be integrally formed with host 102 or may be an add-on device. When configured as an add-on component, device substance communication connector component 110 may also function as an adapter to enable a host and an accessory device having dissimilar substance communication coupling systems to be indirectly coupled to one another. Device substance communication connector component 112 may be removable or non-removable from portable device. For purposes of discussion, device substance communication connector component 112 is shown integrally formed with portable device 104.

Figure 4:
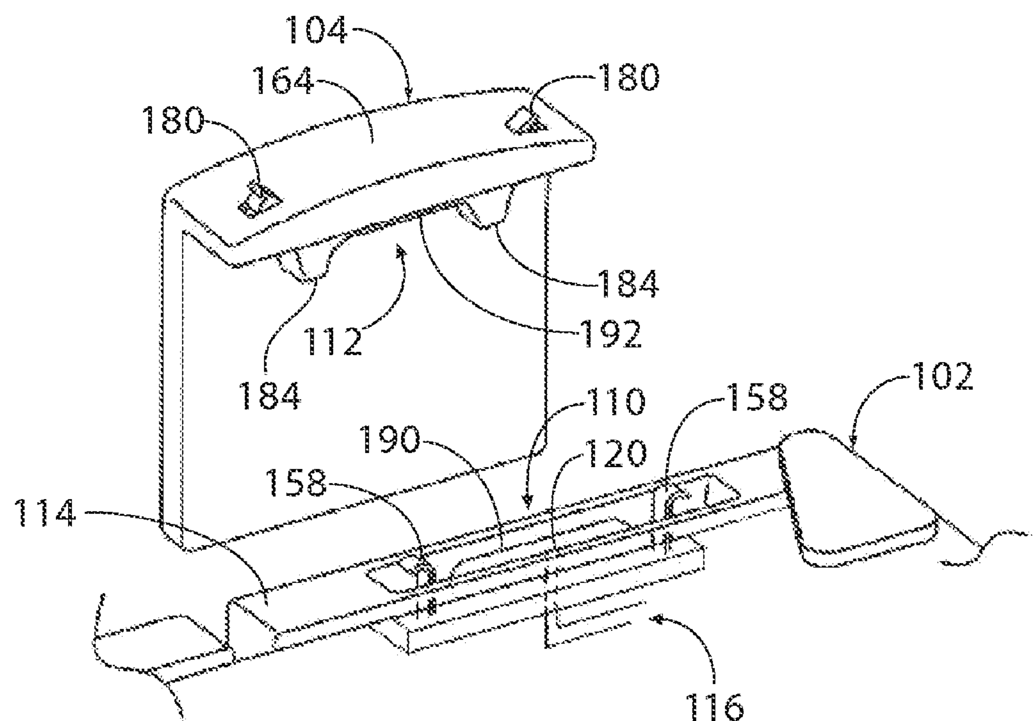
FIG. 4 is a partial top rear perspective view of the modular system of FIG. 1 with the portable device removed from the host, showing a host portion of the mechanically energized substance communication coupling system.
Figure 5:
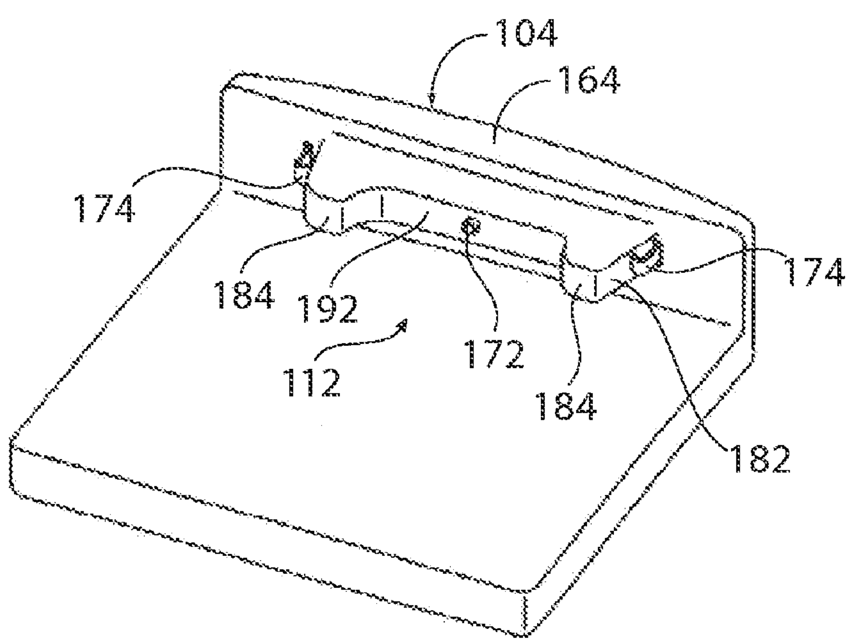
FIG. 5 is bottom perspective view of the portable device of FIG. 1 showing a portable device portion of the mechanically energized substance communication coupling system.

Referring to FIGS. 4 and 5, host substance communication connector component 110 may be enclosed within a housing 114. Housing 114 may be an integral part of host 102 or may be a separate component. For purposes of discussion, housing 114 is illustrated as an integral part of host 102, and more particularly as part of the door of a refrigerator. When configured as an add-on device, host substance communication connector component 110 may also function as an adapter to enable a host and an accessory device having dissimilar substance communication coupling systems to be indirectly coupled to one another. Host substance communication connector component 110 may be removable or non-removable from host 102. Host substance communication connector component 110 can be configured to transfer or receive a single substance or multiple substances.

Host substance communication connector component 110 may include an actuator for establishing a substance pathway between host 102 and portable device 104. As illustrated herein, the actuator can be a substance switch, such as a mechanically actuated substance switch 116, described below in detail, which can be selectively actuated to establish a substance pathway between host 102 and portable device 104 when portable device 104 is coupled to host 102. In addition, host substance communication connector component 110 and device substance communication connector component 112 may also provide a mechanism, described below in detail, for mechanically securing portable device 104 to host 102.

Host substance communication connector component 110 may include a host substance communication conduit 120 operable for transferring a substance to and from host 102. For purposes of discussion, host conduit 120 is illustrated generically in the drawings as tube-like structure. The generically illustrated configuration is not intended to depict any particular configuration, but rather schematically represents a variety of potentially different configurations. In practice, the actual configuration will likely vary depending, at least in part, on the type of substance being transferred, the pressure at which the substance is being transferred and manufacturing considerations. It shall be appreciated that host conduit 120 may include other configurations to accommodate various design considerations.

As illustrated, mechanically actuated substance switch 116 controls the flow of substance through host conduit 120. However, it should be understood that various substance switches may be used to control substance flow through host conduit 120, such as a valve, a pump, or a fan. The type of substance switch may be designed to fail in a non-flowing condition, such as a normally closed valve requiring power to open.

Device substance communication connector component 112 can be integrally formed with portable device 104 or may be an add-on component. As described above, it may be directly integrated into an accessory device or instead integrated into an adapter to which an accessory device is in turn mounted. For purposes of discussion, device substance communication connector component 112 is shown integrally formed with portable device 104. When configured as an add-on component, device substance communication connector component 112 may also function as an adapter to enable a host and a portable device having dissimilar substance communication coupling systems to be indirectly coupled to one another. Device substance communication connector component 112 may be removable or non-removable from portable device 104. Device substance communication connector component 112 can be configured to transfer or receive a single substance or multiple substances and may also be configured to transfer additional services such as electrical power, mechanical power, data, illumination, sound or heat.

Device substance communication connector component 112 may be enclosed within a housing 164. Housing 164 may be an integral part of portable device 104 or may be a separate component. For purposes of discussion, housing 164 is illustrated as an integral part of portable device 104.

Figure 6:
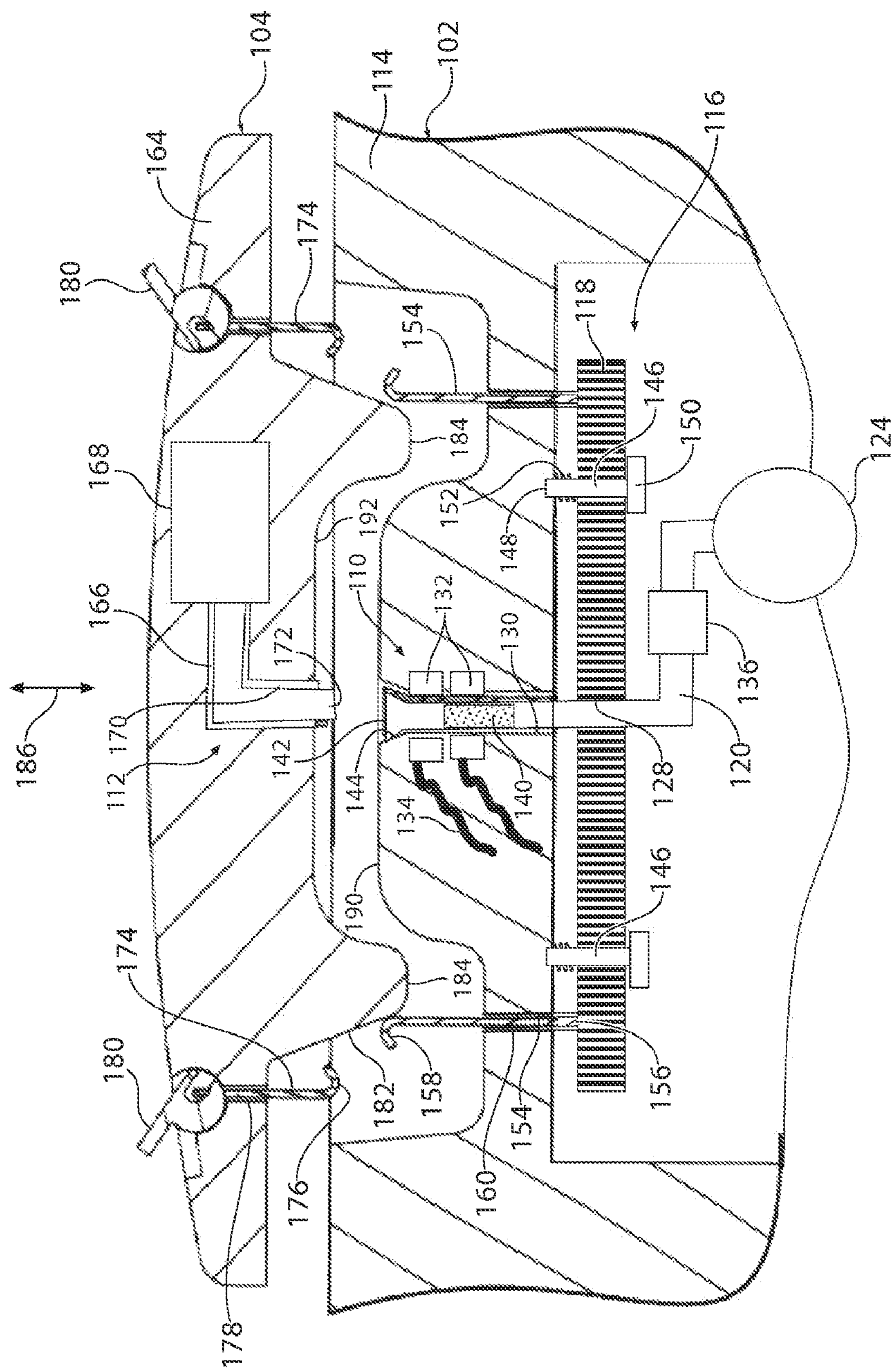
FIG. 6 is a partial cross-sectional view of the modular system of FIG. 1, showing the portable device portion of the substance communication coupling system positioned for engagement with the host portion of the substance communication coupling system.
Figure 7:
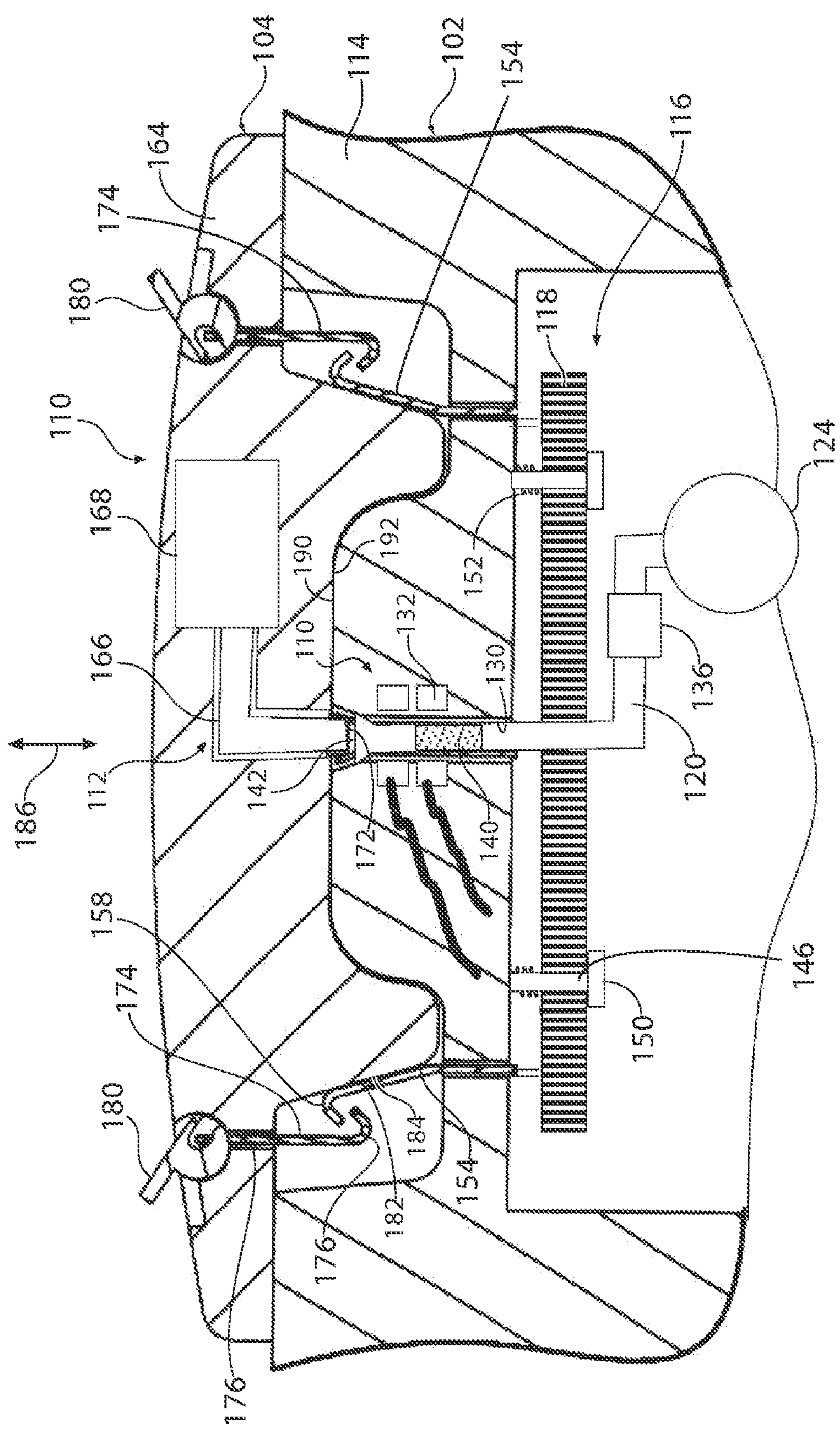
FIG. 7 is a partial cross-sectional view similar to FIG. 6, showing the portable device portion of the substance communication coupling system engaged with the host portion of the substance communication coupling system, with the substance communication coupling system in an unlatched state.
Figure 8:
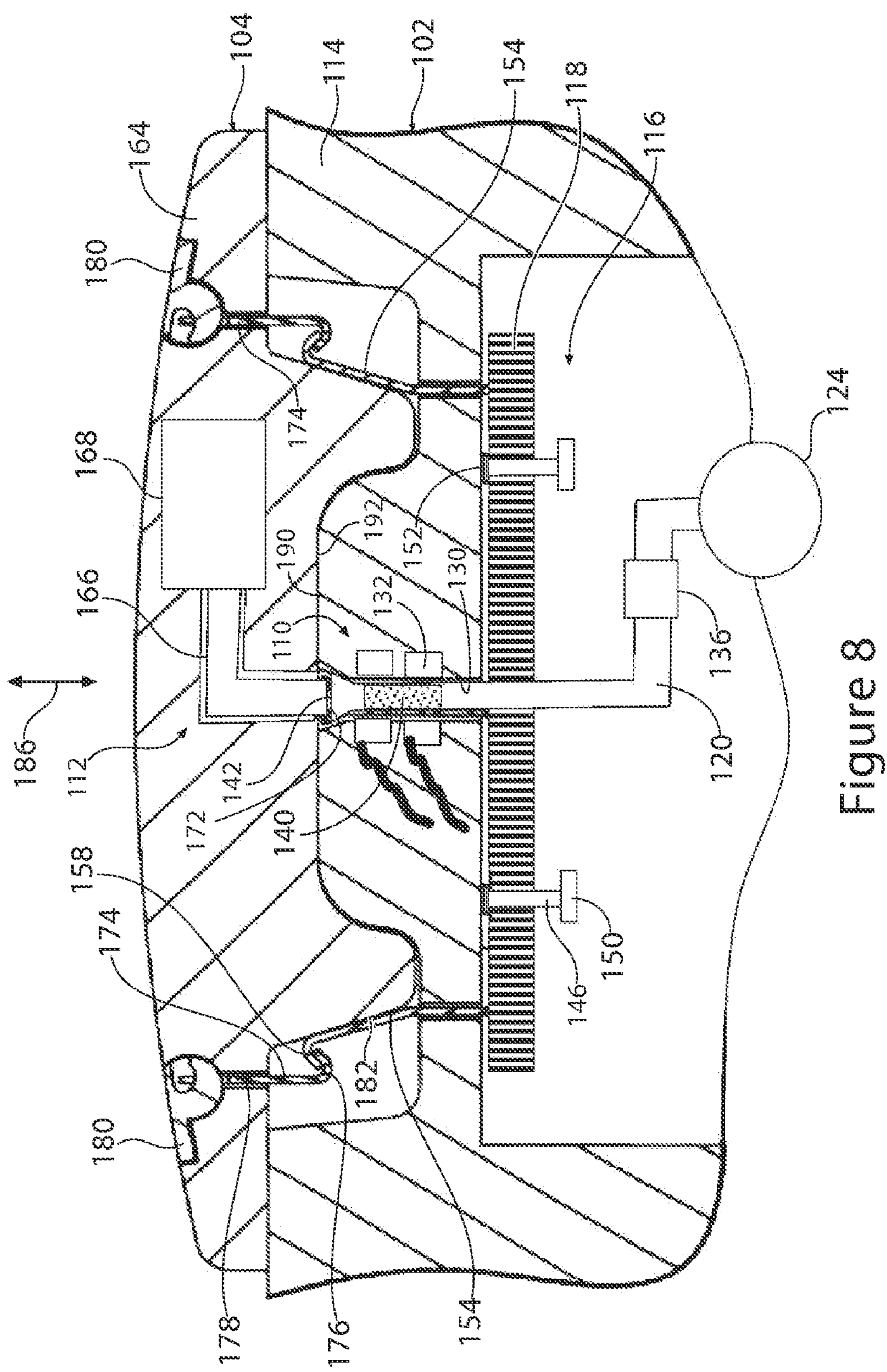
FIG. 8 is a partial cross-sectional view similar to FIG. 6, showing the portable device portion of the substance communication coupling system engaged with the host portion of the substance communication coupling system, with the substance communication coupling system in a latched state.

Referring to FIGS. 6 through 8, service switch 116 may be enclosed within housing, such as housing 114. Substance switch 116 includes a switch plate 118 movable between an open position (see FIGS. 6 and 7) and closed position (see FIGS. 8), in a manner to be described later in detail, to enable a substance to be selectively transferred between host 102 and portable device 104 when portable device 104 is coupled to host 102. Substance switch 116 is generally disposed in the open position when portable device 104 is decoupled from host 102.

As best shown in FIG. 6, host conduit 120 is in communication at one end to a supply of substance, such as a substance provider 124. Host conduit 120 extends through an aperture 128 in switch plate 118 and is attached to switch plate 118, such as by welding, brazing, gluing, or any other suitable fixturing method to be selectively movable with switch plate 118. Host conduit 120 extends from switch plate 118 into a passageway 130 extending through housing 114. Passageway 130 is sized to be slightly larger than host conduit 120 to allow host conduit 120 to be moved freely by switch plate 118 along a length of passageway 130.

A proximity sensor, such as electrical contacts 132, may be provided in housing 114 and extending into passageway 130 to sense the position of host conduit 120. For example, housing 114 may be made of dielectric material and electrical contacts 132 may be spaced apart rings of conductive material molded into housing 114. Each of the contacts 132 may be connected by an electrical line 134 to a control circuit, not shown, responsive to the creation of an electrical connection between contacts 132 to operate a substance flow regulating component 136 capable of selectively inhibiting the flow of substance from substance provider 124 to host conduit 120. With respect to the substance flow regulating component 136 it should be understood that the substance flow regulating component 136 should be configured to stop substance flow through conduit 120 if there is a failure of the control apparatus associated with the substance flow regulating component 136. For example, if the substance flow regulating component 136 is a valve, it should be a normally closed valve such that if there is a failure in the control circuit the system will fail such that substance will not flow.

A proximity target, such as a conductive surface 140 formed on the exterior of host conduit 120, is selectively engageable with the electrical contacts 132 to complete a circuit between the electrical contacts 132 and thereby, permit the proximity sensor to detect the repositioning of the host conduit in the passageway 130, and operate flow regulating component 136. Host conduit 120 may be formed of a dielectric material and conductive surface 140 may be formed from a conductive foil or coating applied to the exterior surface of host conduit 120 or a conductive ring molded into host conduit 120.

The distal end 142 of host conduit 120 may be tapered outwardly and cooperates with a chamfered open end 144 of passageway 130 opening to the exterior of housing 114 to restrict the removal of host conduit 120 from passageway 130. Distal end 142 of host conduit 120 forms a receptacle able to operably engage a corresponding substance terminal of portable device 104, described below, when the portable device is coupled to host 102. It will be appreciated that portions of housing 114 cooperate with the distal end 142 of host conduit 120 to define a receptacle for coupling with a plug, described below.

Switch plate 118 is slidably mounted to at least one guide rod 146. An end 148 of guide rod 146 can be fixedly attached to housing 114. An opposite end of guide rod 146 may include a stop 150, which can be sized larger than the guide rod 146 to prevent switch plate 118 from traveling past the stop 150. A biasing member 152 may be disposed between housing 114 and switch plate 118 to urge switch plate 118 toward stop 150.

Service switch 116 further includes at least one host actuating link 154 fixedly attached to switch plate 118 at one end 156 of actuating link 154. Actuating link 154 extends from switch plate 118 through an aperture 160 in housing 114 and has a hook-shaped portion 158 disposed at its distal end outside of the housing 114. Hook-shaped portion 158 allows actuating link 154 to selectively connect to a corresponding device actuating link 174, described below, portable device 104. Sufficient clearance is provided between host actuating link 154 and aperture 160 to allow host actuating link 154 to move freely in and out of the housing 114 and thereby move switch plate 118 to move host conduit 120 along passageway 130. Host actuating link 154 may be constructed of a flexible material having a relatively high modulus of elasticity, such as spring steel, or another generally flexible material having similar mechanical properties.

Device substance communication connector component 112 may include a device substance communication conduit 166 operable for transferring a substance to and from portable device 104. For purposes of discussion, device substance communication conduit 166 is illustrated generically in the drawings as tube-like structure. The generically illustrated configuration is not intended to depict any particular configuration, but rather schematically represents a variety of potentially different configurations. In practice, the actual configuration will likely vary depending, at least in part, on the type of substance being transferred, the pressure at which the substance is being transferred and manufacturing considerations. It shall be appreciated that device conduit 166 may include other configurations to accommodate various design considerations.

Device conduit 166 is in communication at one end with a substance consumer 168. Device conduit 166 is fitted through an aperture 170 in housing 164 and terminates in an exposed end 172 disposed outside of housing 164. Device conduit 166 is fastened, secured or molded into housing 164 so as to move with housing 164. It will be appreciated that the exposed end 172 of device conduit 166 cooperates with portions of housing 164 to form a plug engageable with the receptacle formed by the distal end 142 of host conduit 120 in cooperation with housing 114.

Device substance communication connector component 112 may include at least one device actuating link 174 that can connect to host actuating link 154 of host substance communication connector component 110 when portable device 104 is coupled to host 102. Device actuating link 174 may include a hook-shaped portion 176 that can be coupled to the correspondingly hook-shaped potion 158 of host actuating link 154. An opposite end 178 of device actuating link 174 can be operably connected to a toggle switch 180, or similar device. Toggle switch 180 can be moved between a latched position, shown in FIGS. 6 and 7, and an unlatched position, shown in FIG. 8, as described below. Device actuating link 174 may be constructed of a similar material as host actuating link 154.

Referring generally to FIGS. 4 through 6, it will be appreciated that host substance communication connector component 110 and device substance communication connector component 112 may include various geometric features to facilitate coupling of portable device 104 to host 102. For example, host substance communication connector component 110 may include a raised boss 190 that can engage a corresponding recess 192 of device communication connector component 112. A raised ridge 184 at least partially defines an outer boundary of recess 192. Alignment features such as raised boss 190 and recess 192 may assist with positioning of device substance communication coupler 112 relative to host substance communication connector component 110 prior to engagement, and may also function to minimizing lateral movement of portable device 104 relative to host 102 when device substance communication connector component 112 is coupled to host substance communication connector component 110. It shall be appreciated, however, that the illustrated configuration is merely one example of the type of features that may be incorporated into host substance communication connector component 110 and device substance communication connector component 112 to aid alignment and coupling of portable device 104 to host 102. In practice, other configurations may also be employed to accommodate various design considerations of a particular application.

Referring to FIGS. 6 through 8, to facilitate coupling and decoupling of device actuating link 174 with host actuating link 154, device actuating link 174 can be offset laterally relative to host actuating link 154 to allow hook-shaped portion 176 of device actuating link 174 to clear hook-shaped portion 158 of the host actuating link 154 when portable device 104 is attached to host 102. For example, referring particularly to FIG. 6, with portable device 104 positioned for engagement with host 102, hook-shaped portion 158 of host actuating link 154 is initially offset from hook-shaped portion 176 of device actuating link 174. As device substance communication connector component 112 is moved into engagement with host substance communication connector component 110, as shown in FIG. 7, end 156 of host actuating link 154 engages an outer surface 182 of ridge 184 extending from housing 114. Surface 182 is inclined relative to an engagement path denoted by arrow 186. Arrow 186 depicts a path along which portable device 104 can be moved when coupling and decoupling portable device 104 to and from host 102. Further movement of device substance communication connector component 112 toward host substance communication connector component 110 causes hook-shaped portion 158 of host actuating link 154 to travel along inclined surface 182, which in turn elastically displaces hook-shaped portion 158 of host actuating link 154 toward hook-shaped portion 176 of device actuating link 174. With device substance communication connector component 112 fully engaged with host substance communication connector component 110 (see FIG. 7), hook-shaped portion 158 of host actuating link 154 is sufficiently displaced from its decoupled position (see FIG. 6) so as to axially overlap hooked-shaped portion 176 of device actuating link 174. Moving toggle switch 180 from the unlatched to the latched position retracts device actuating link 174, as shown in FIG. 8.

While the substance switch 116 was described above as being an actuator for establishing a substance pathway between host 102 and portable device 104, the cooperating links 154 and 174, and toggle switch 180 may also be considered to be an actuator for establishing a substance pathway between host 102 and portable device 104, alone or in combination with the substance switch 116.

The process is reversed when disengaging portable device 104 from host 102. As device substance communication connector component 112 is disengaged from host substance communication connector component 110, hook-shaped portion 158 of host actuating link 154 slides along inclined surface 182 and is moved out of alignment with hooked-shaped portion 176 of device actuating link 174, as shown in FIG. 6. Moving toggle switch 180 from the latched position to the unlatched position causes device actuating link 174 to be extended.

Coupling of portable device 104 to host 102 can be accomplished by positioning portable device 104 adjacent host 102 in such a manner that device substance communication connector component 112 is generally aligned with host substance communication connector component 110, as shown in FIG. 6. Device substance communication connector component 112 and host substance communication connector component 110 can be coupled together by generally moving portable device 104 toward host 102 along the path indicated by arrow 186 until the two members are fully seated, as shown in FIG. 7. With device substance communication connector component 112 fully engaging host substance communication connector component 112, exposed end 172 of device conduit 166 aligns with end 142 of host conduit 120. However, since substance switch 116 has not yet been activated, the substance communication path between portable device 104 and host 102 remains incomplete and the supply of substance to host conduit 120 remains closed.

Substance switch 116 can be activated by moving toggle switch 180 to the latched position, as shown in FIG. 8. Doing so causes hook-shaped portion 176 of device actuating link 174 to engage hook-shaped portion 158 of host actuating link 154, which in turn results in host actuating link 154 being pulled toward portable device 104 by device actuating link 174. Switch plate 118 and host conduit 120 are pulled along with host actuating link 154 towards housing 164, causing exposed end 172 of device conduit 166 to engage with end 142 of host conduit 120, effectively completing the formation of a substance communication path between portable device 104 and host 102.

Furthermore, as host conduit 120 is advanced into engagement with device conduit 166, the proximity sensor, represented by electrical contacts 132 on the inner walls of passageway 130 is engaged by the proximity target, represented by the conductive surface 140. A circuit is completed which permits flow regulating component 136 to open and permit the flow of substance from the substance provider 124.

It should be noted that substance switch 116 is intended to selectively permit and inhibit flow of substance from the substance provider 124 to the host conduit 120 based on the presence of a proximity target associated with the conduit 120 or the switch plate 118 by a proximity sensor associated with the housing 114 and the alternative sensors and targets may be used for this purpose. It should further be noted that the proximity sensor is intended to deliver a signal or message selectively permitting or selecting inhibiting the flow of substance to host conduit 120 and that the signal represented in the drawings and described above as the completion of an electrical circuit is merely one example of various signals or messages that may be used for this purpose. It should also be noted that additional valves and controls, besides those represented in the drawings and described herein, may be provided to further regulate the flow of substance based on the needs of the user of the portable device 104.

Portable device 104 can be decoupled from host 102 by reversing the previously described process for coupling the two together. For example, substance switch 116 can be moved to the open position by cycling toggle switch 180 from the closed position (see FIG. 8) to the open position (see FIG. 7). Doing so extends device actuating link 174 and allows biasing member 152 to move switch plate 118 toward stop 150 of guide rod 146. Switch plate 118 eventually contacts stop 150. Further movement of switch plate 118 away from portable device 104 causes end 142 of host conduit 120 to disengage exposed end 172 of device conduit 166, thereby interrupting the substance communication path between portable device 104 and host 102 (see FIG. 7). Switch plate 118 stops moving upon contacting stop 150 of guide rod 146. Once toggle switch 180 has been moved to the unlatched position, portable device 104 can be removed from host 102 by withdrawing portable device 104 from host 102 along a path generally parallel to path defined by arrow 186. Furthermore, as host conduit 120 is retracted from engagement with device conduit 166, the proximity sensor acts to inhibit flow regulating component 136 from opening to permit the flow of substance from the substance provider 124.

Figure 9A:
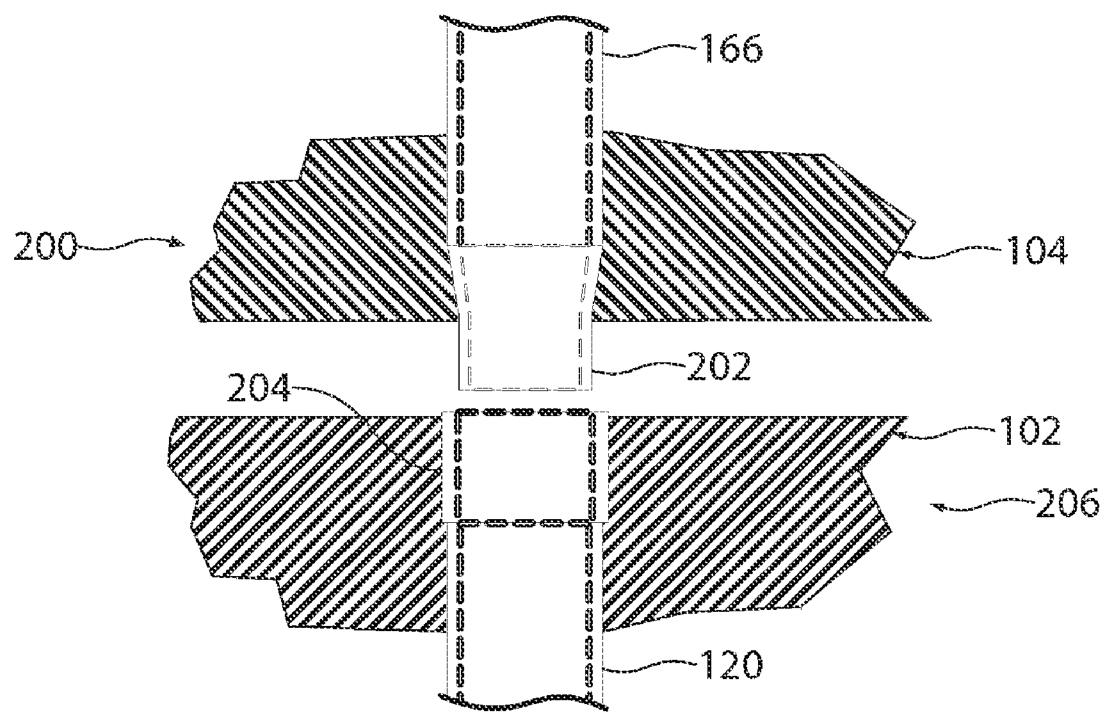
FIG. 9A is an enlarged cross-sectional view of a portion of a substance communication coupling system according to a second embodiment of the invention having connector components for sealing coupling a portable device to a host.
Figure 9B:
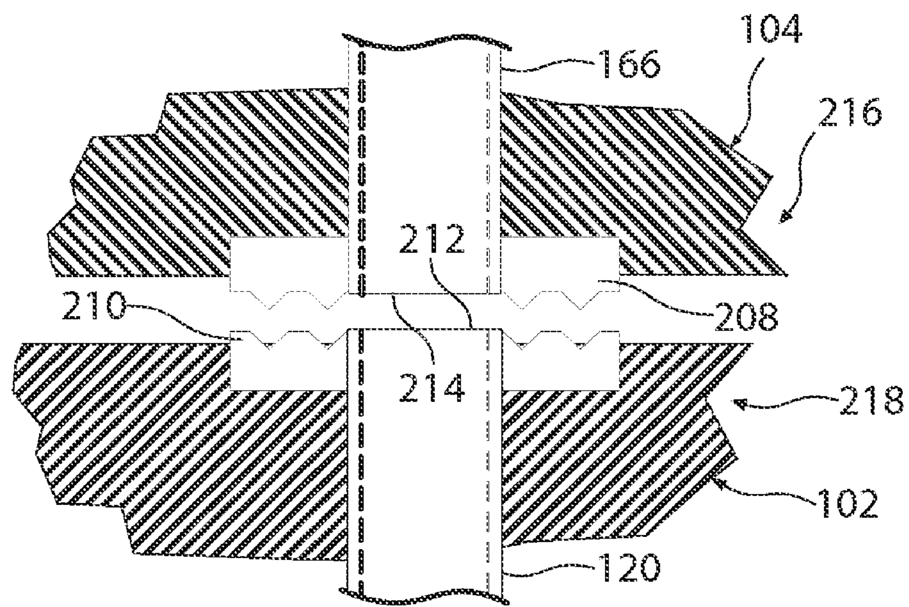
FIG. 9B is an enlarged cross-sectional view of a portion of a substance communication coupling system according to a third embodiment of the invention having connector components for sealing coupling a portable device to a host.

It will be appreciated that connector components or forms on the respective ends of the conduits described above may differ depending on various factors, such as the type of substance being transferred and the pressures involved. Some systems, such as water systems may use compression fittings that may be completely reusable or partially reusable with the replacement of some components. FIGS. 9A and 9B show modular system according to other embodiments of the invention with alternative connector components.

Referring to FIG. 9A, a modular system according to a second embodiment of the invention is shown and comprises a host 102 having a host substance communication connector component 206 and a portable device 104 having a device substance communication connector component 200. The device substance communication connector component 200 may include a device conduit 166 in communication with a substance consumer (not shown) having a tapered exposed end 202 for compression fit into an enlarged exposed end 204 of a host conduit 120 of host substance communication connector component 206. Host conduit 120 may be in communication with a substance provider (not shown).

Referring to FIG. 9B, a modular system according to a third embodiment of the invention is shown and comprises a host 102 having a host substance communication connector component 218 and a portable device 104 having a device substance communication connector component 216. Device substance communication connector component 216 may include a device conduit 166 in communication with a substance consumer (not shown) having an exposed end 214. Host substance communication connector component 218 may include a host conduit 120 in communication with a substance provider (not shown) having an exposed end 212. Gaskets 208 and 210 are respectively provided about the exposed ends 214 and 212. The gaskets 208 and 210 may be made of foam for a crush-type fit, which may be useful for substance communication involving gases. The gaskets 208 and 210 may be fit together to seal the substance communication connector components 216 and 218 when they are coupled together.

In other installations, not illustrated herein, there may be simple threaded fittings, or capped compression fittings, an example of which will be described shortly. Still other systems, such as sealed systems for refrigeration, may use welds, brazes and chemical bonding which are all meant to be permanent. It will be appreciated that for multiple make-break connections turning motion on gasket surfaces is avoided and compression is preferred.

Figure 10:
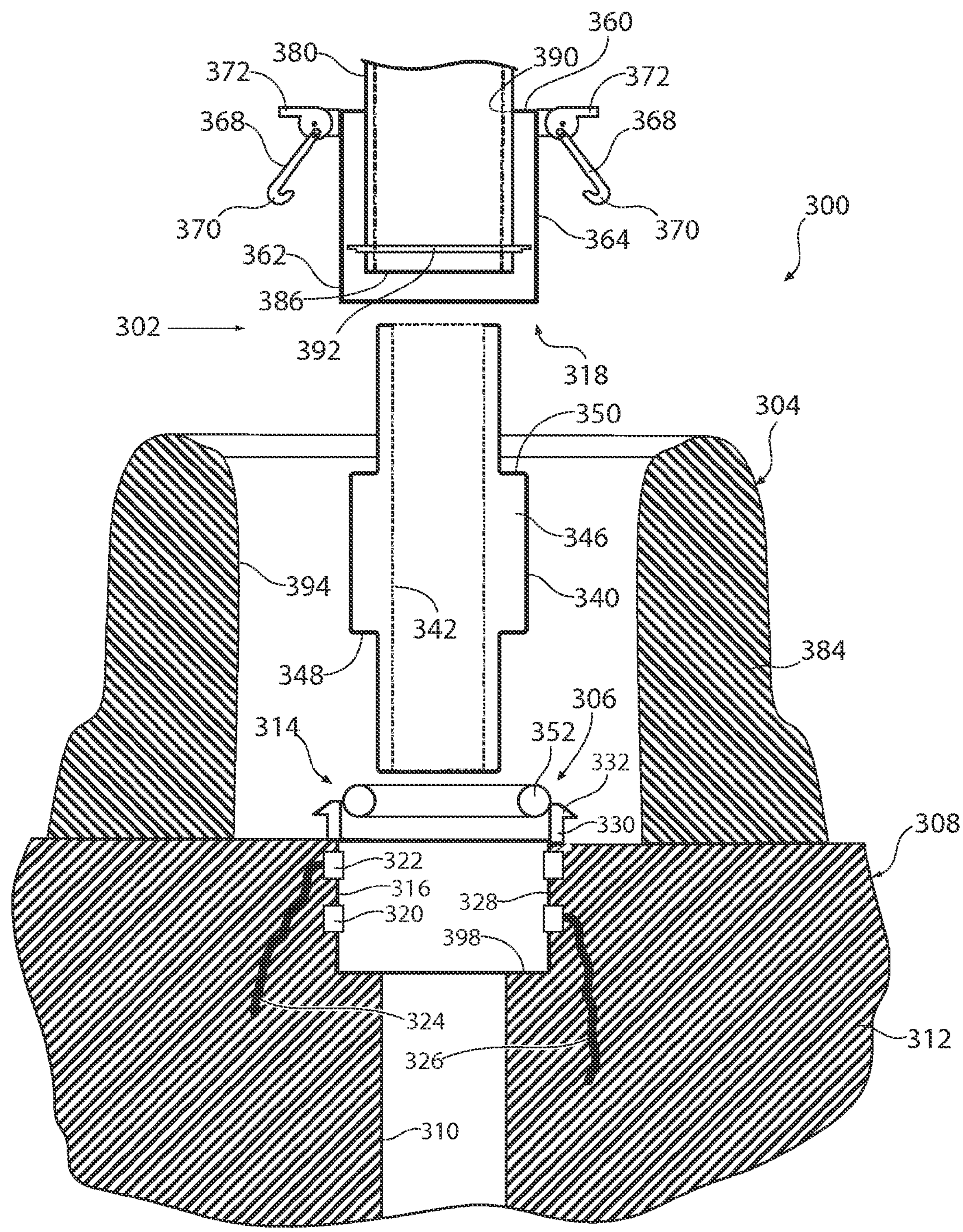
FIG. 10 is a partial exploded view of a mechanically energized substance communication coupling system according to a fourth embodiment of the invention.
Figure 11:
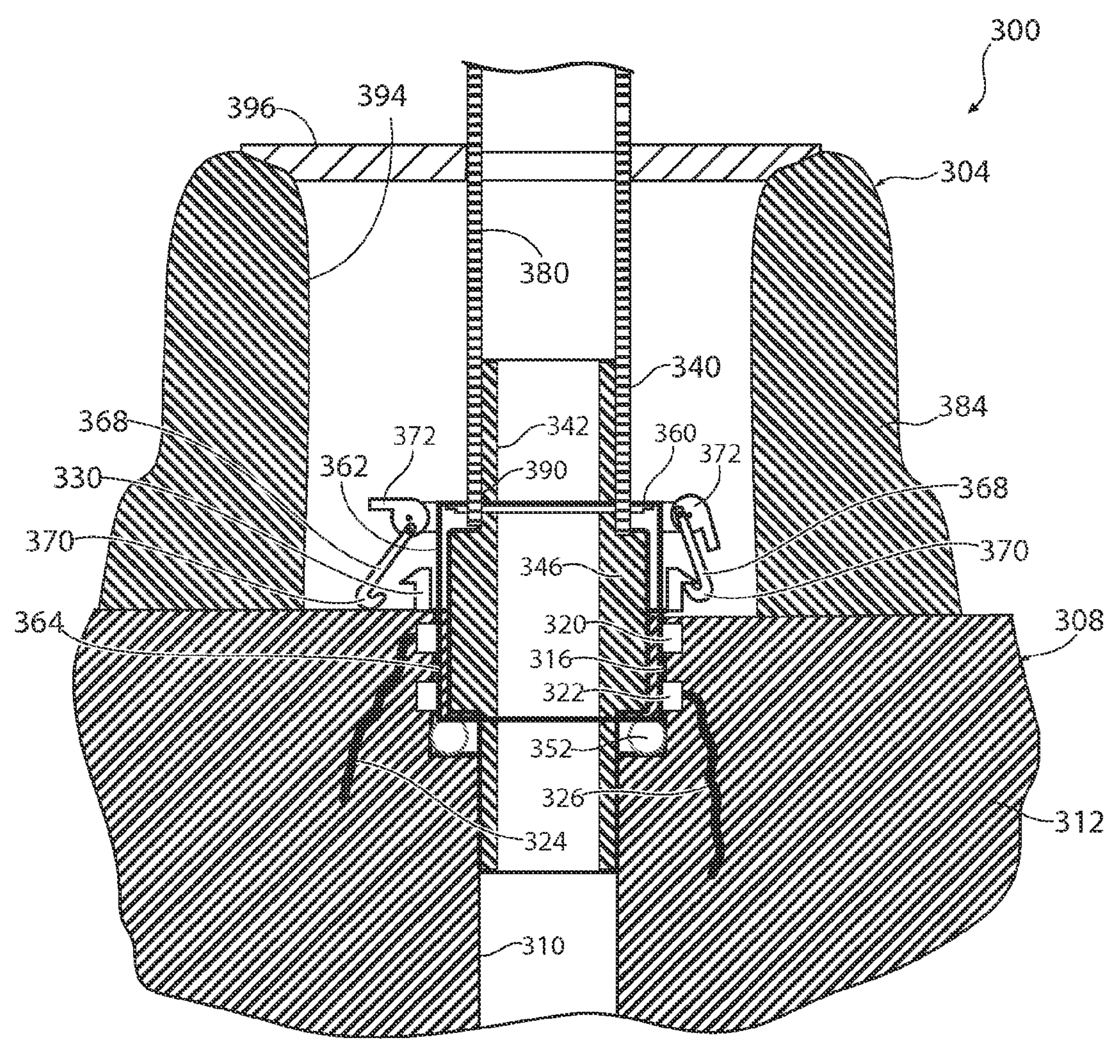
FIG. 11 is a partial cross-sectional view of the mechanically energized substance communication coupling system of FIG. 10, showing a portable device portion of the substance communication coupling system engaged with a host portion of the substance communication coupling system, with the substance communication coupling system in a partially latched state.

Referring to FIGS. 10 and 11, a substance communication coupling system 300 according to a fourth embodiment of the invention is shown and includes a device substance communication connector component 302 associated with a portable device 304 comprising an accessory device or an adapter or both, and a host substance communication connector component 306 associated with a host 308.

The host substance communication connector component 306 may include a substance line 310 formed in the housing 312 of the host 308 leading to a switching valve, not shown, to selectively supply substance from a substance supply, not shown. The substance line 310 terminates in a host interface 314 including an enlarged bore 316 for accepting a device interface 318, described below, of the device substance communication connector component 302. The host interface 314 further includes a proximity sensor, such as a plurality of electrical contacts 320 and 322 disposed around annular surface 328 of the enlarged bore 316. The proximity sensor is connected by control signal lines, such as electrical lines 324 and 326, to selectively provide a control signal to activate the switching valve to permit the supply of substance to the host interface 314. One or more links 330 may extend upwardly from housing 312 adjacent enlarged bore 316. Each link 330 is provided with an outwardly oriented flange 332 for a purpose to be described shortly.

Device substance communication connector component 302 includes a fluidic coupler 340. Fluidic coupler 340 may be an elongated pipe segment having a fluid passage 342 therethrough and an enlarged central outer wall portion 346 defining opposing annular surfaces 348 and 350. The device substance communication connector component 302 further includes a flexible seal ring 352 which may be fitted over one end of fluidic coupler 340 to abut annular surface 348 (see FIG. 11).

Device substance communication connector component 302 also includes device service interface 318 comprising a cap 360 having an outer surface 362 engageable with enlarged bore 316 in a manner described below. Cap 360 has a proximity target, such as a conductive surface portion 364, on its outer surface 362 selectively engageable with electrical contacts 320 and 322 when cap 360 is fully engaged in bore 316. Cap 360 further may include one or more links 368 having hooks 370 selectively engageable with flanges 332 of links 330 when cap 360 is disposed in enlarged bore 316. A switch, such as toggle switch 372, is provided to exert a pulling action on the links 368 and 330 to exert a pulling action to draw cap 360 further into bore 316 when desired.

Device substance communication connector component 302 further includes a substance line 380 extending from a substance consumer, not shown, within the portable device 304 to a distal end 386 forming a portion of the device service interface 318 for delivery of substance from the host 308 to the device service interface 318. Substance line 380 may be flexible to permit the portable device 304 to be mounted to the base before the fluid coupling is complete. Substance line 380 extends through an aperture 390 in cap 360 and terminates in a sealing flange 392 trapping cap 360 on substance line 380.

A recess 394 may be provided in the housing 384 of portable device 304 for access to device substance communication connector component 302 when coupling device substance communication connector component 302 to host substance communication connector component 306 and for at least partially containing the device service interface 318 when installed. A cover 396, shown in FIG. 11, may be provided to cover recess 394 and enclose the device service interface 318 when installed.

The process of coupling and decoupling portable device 304 with host 308 will now be described. If desired, portable device 304 may be mechanically connected to host 308 prior to completing the fluid coupling therebetween. Coupling of portable device 304 to host 308 can be accomplished passing the fluidic coupler 340 through the seal ring 352 and into the bore 316 and partially into the substance line 310 until the seal ring 352 is trapped between seat 398 of bore 316 and the annular surface 348 of fluidic coupler 340. Next, the portable device 304 is disposed adjacent host 308 with the fluidic coupler 340 passing through recess 394 in housing 384.

Next the distal end 386 of substance line 380 is fitted onto the exposed end of fluidic coupler 340 and cap 360 is slid along substance line 380 over the top of fluidic coupler 340 and into bore 316 in housing 312 of host 308 to abut with seal ring 352. At this point, links 368 are engaged with links 330 and toggle switches 372 are operated to drive cap 360 further into bore 316, forming a seal between device substance communication connector component 302 and host substance communication connector component 306 and mechanically latching cap 360 to housing 312 of host 308. As shown in FIG. 11, the toggle switch 372 on the left side of the page is shown in an unlatched position and the toggle switch 372 on the right side of the page is shown in a latched position.

Furthermore, toggle switch 372 drives the links 368 and 330 to advance cap 360 further into bore 316, conductive surface portion 364 of outer surface 362 of cap 360 advances along annular surface 328 (see FIG. 10) of enlarged bore 316, distal end 386 engages annular surface 350 (see FIG. 10) of the fluidic coupler 340 and drives fluidic coupler 340 further into substance line 310, compressing seal ring 352 and sealing flange 348 and forming a sealed engagement between the device substance communication connector component 302 and the host substance communication connector component 306.

As outer surface 362 (see FIG. 10) of cap 360 advances further along annular surface 328 (see FIG. 10) of enlarged bore 316, the electrically conductive portion 364 of the outer surface 362 encounters electrical contacts 320 and 322 and connects electrical lines 324 and 326, permitting the flow of a control signal to a switching valve, not shown, to permit the flow of substance from the substance supply, not shown, of the host substance communication connector component 302 through the device substance communication coupling system 304 to a substance consumer, not shown.

Portable device 304 may be decoupled from host 308 by reversing the previously described process for coupling the two devices together. Disengaging links 330 and 368 results in the retreat of the electrically conductive portion 364 of the outer surface 362 from electrical contacts 320 and 322, preventing the proximity sensor from sending a control signal to permit the flow of substance.

Figure 12:
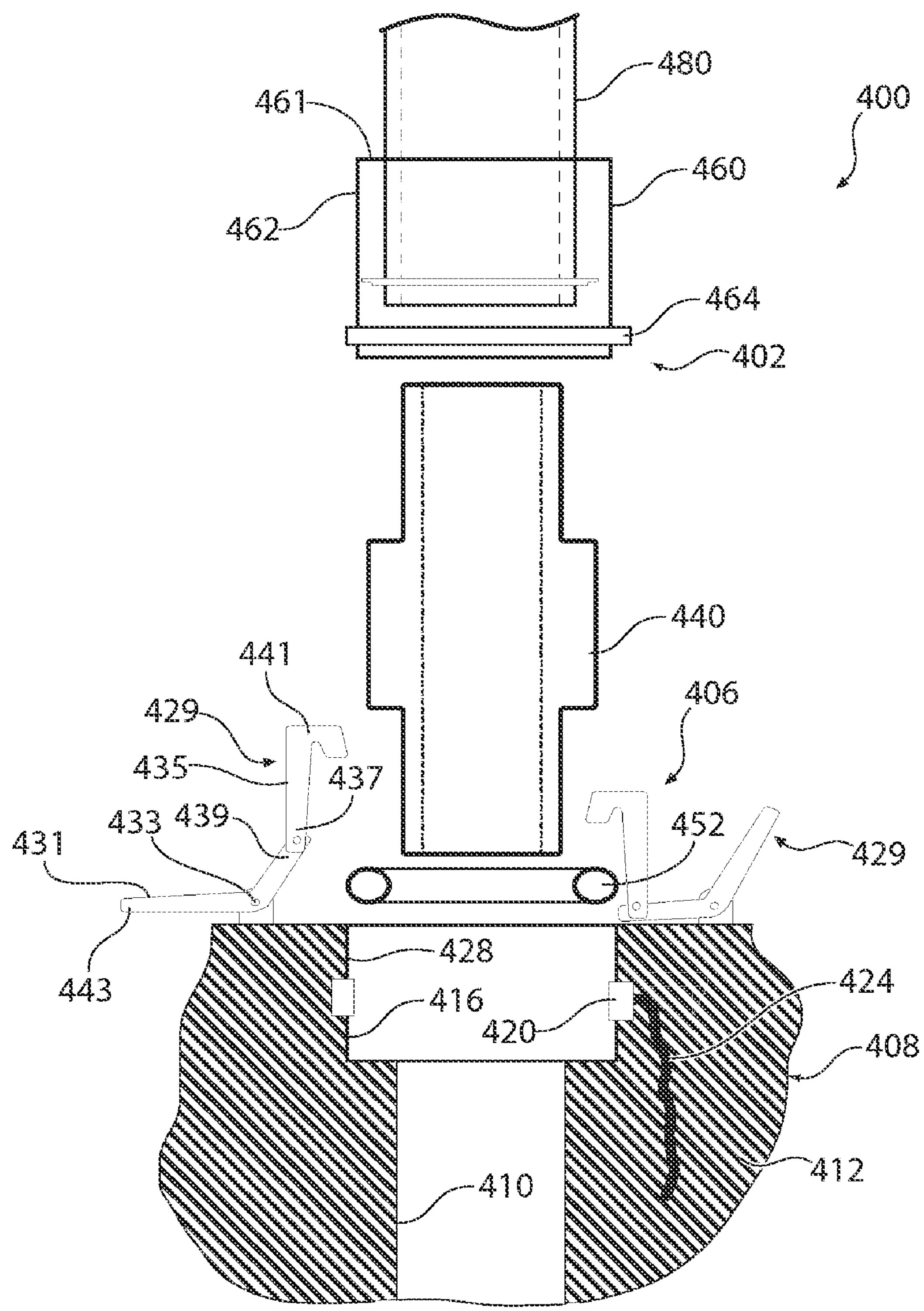
FIG. 12 is a partial exploded view of a mechanically energized substance communication coupling system according to a fifth embodiment of the invention.
Figure 13:
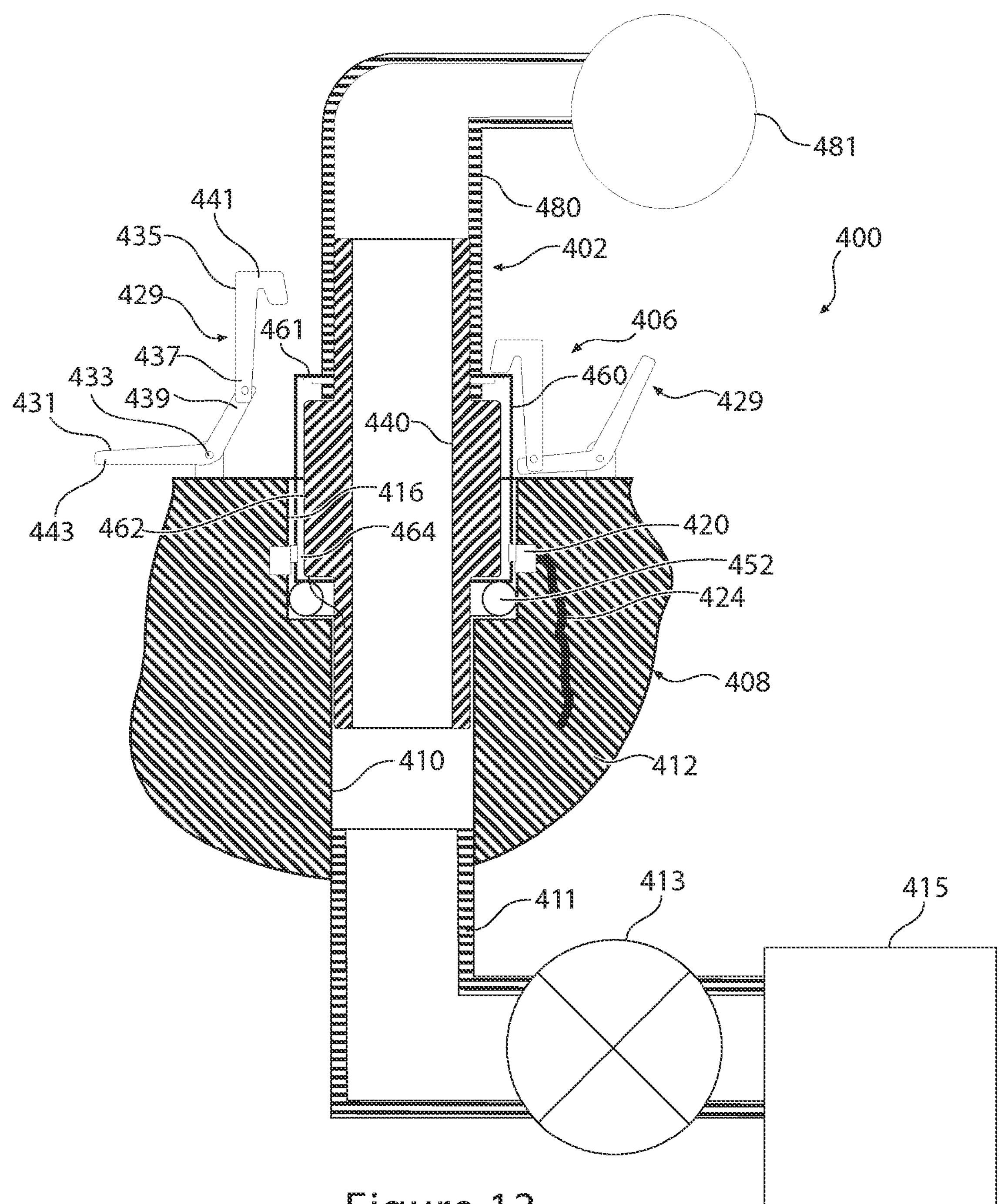
FIG. 13 is a partial cross-sectional view of the mechanically energized substance communication coupling system of FIG. 12, showing a portable device portion of the substance communication coupling system engaged with a host portion of the substance communication coupling system, with the substance communication coupling system in a partially latched state.

Referring to FIGS. 12 and 13, a substance communication coupling system 400 according to a fifth embodiment of the invention is shown and includes a device substance communication connector component 402 associated with a portable device, not shown, and a host substance communication connector component 406 associated with a host 408. Substance communication coupling system 400 is similar to substance communication coupling system 300 described above with reference to FIGS. 10 and 11, except as described below.

Device substance communication connector component 402 includes a fluidic coupler 440, a flexible seal ring 452, and a cap 460. Device substance communication connector component 402 further includes supply line 480 extending from a substance consumer 481 within portable device.

Host substance communication connector component 406 includes a substance line 410 formed in a housing 412 of the host 408 and connected to a line 411 leading to a switching valve 413 to selectively supply substance from a substance supply 415. Substance line 410 terminates in an enlarged bore 416 for accepting fluidic coupler 440, flexible seal ring 452 and cap 460.

A proximity sensor 420, such as a pressure responsive pad, is disposed around an inner surface 428 of bore 416. Proximity sensor 420 is connected by a control signal line 424 to selectively provide a control signal to activate switching valve 413 to permit the supply of substance to substance line 410. Cap 460 has a proximity target 464, such as a bulge on its outer surface 462.

One or more link system(s) 429 may be mounted to housing 412 of host 408 to selectively clamp and exert downward pressure on cap 460 and drive proximity target 464 into engagement with proximity sensor 420. Each link system 429 may include a first link 431 pivotally mounted at a pivot point 433 to housing 412 and a second link 435 pivotally mounted at its first end 437 to a first end 439 of first link 431. Second link 435 may be provided with an engagement feature 441, such as a hook, for engagement with a top surface 461 of cap 460. First link 431 has a second end 443 disposed on the other side of pivot point 433 from the first end 439. As shown in FIG. 13, link system 429 operates by first aligning the engagement feature 441 with the top surface 461 of cap 460 and then using second end 443 of first link 431 to pivot first link 431 and drive engagement feature 441of second link 435 into engagement with the top surface 461 of cap 460.

Figure 14:
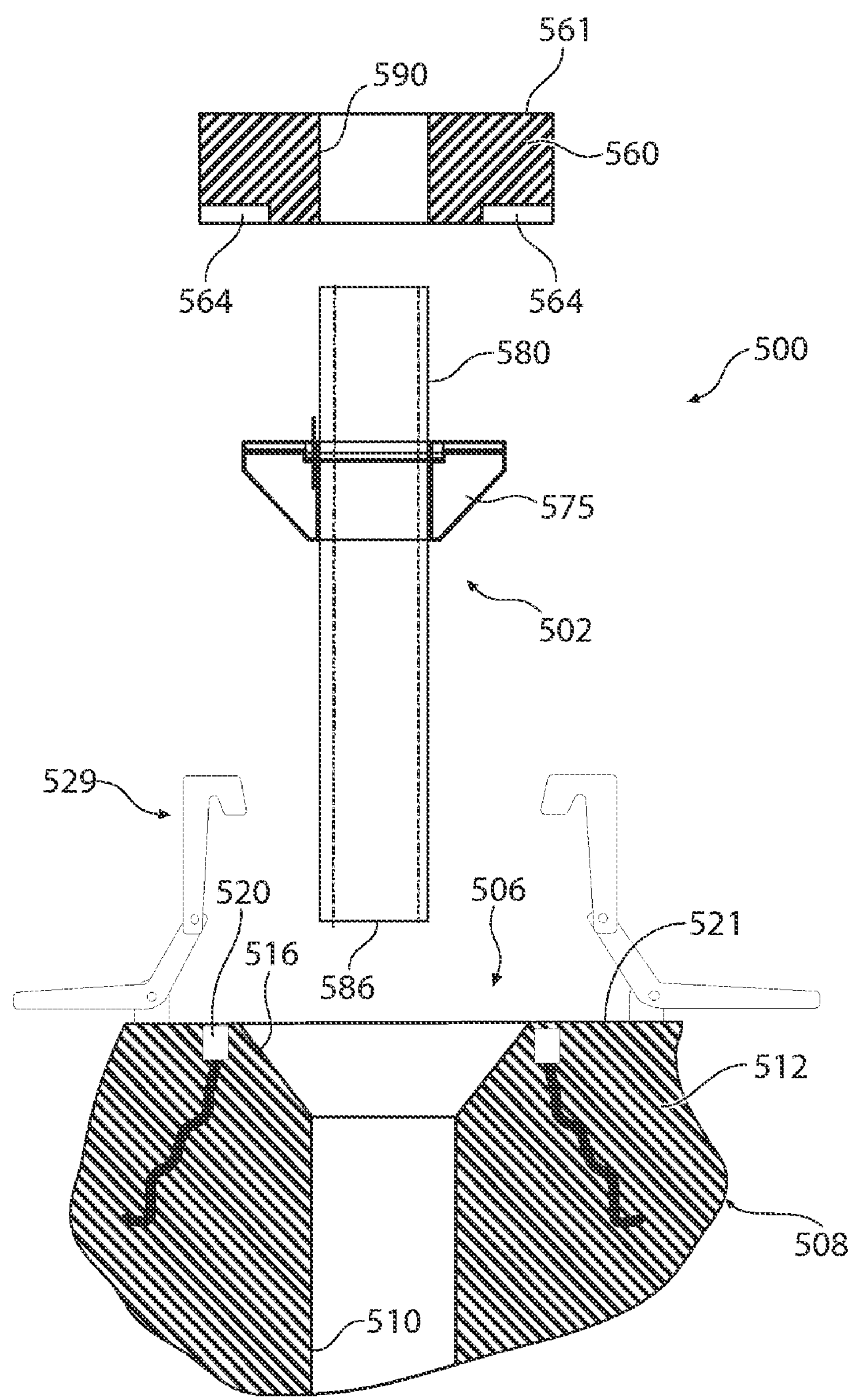
FIG. 14 is a partial exploded view of a mechanically energized substance communication coupling system according to a sixth embodiment of the invention.
Figure 15:
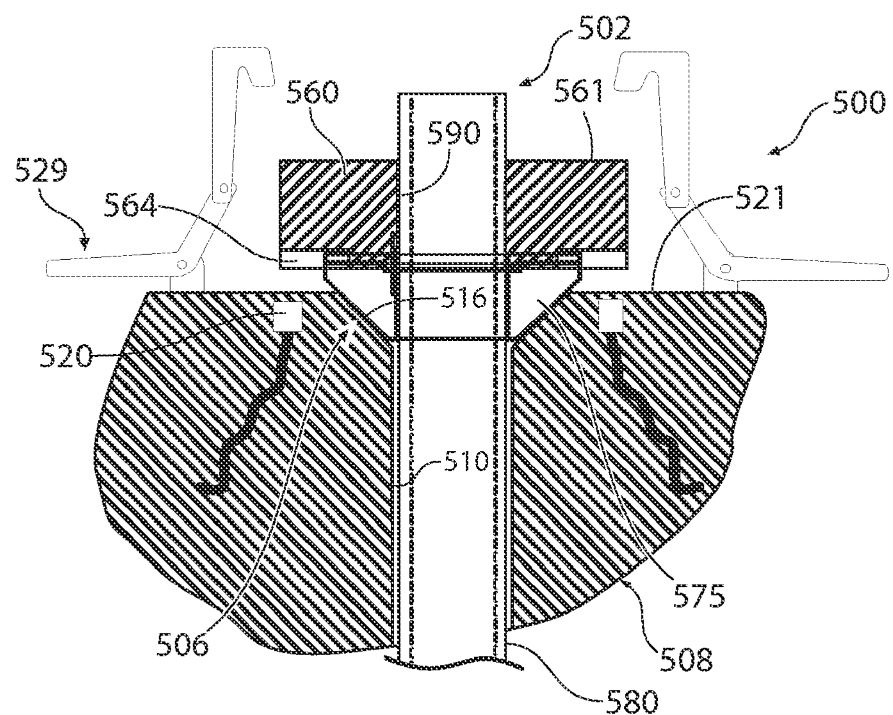
FIG. 15 is a partial cross-sectional view of the mechanically energized substance communication coupling system of FIG. 14, showing a portable device portion of the substance communication coupling system engaged with a host portion of the substance communication coupling system, with the substance communication coupling system in an unlatched state.
Figure 16:
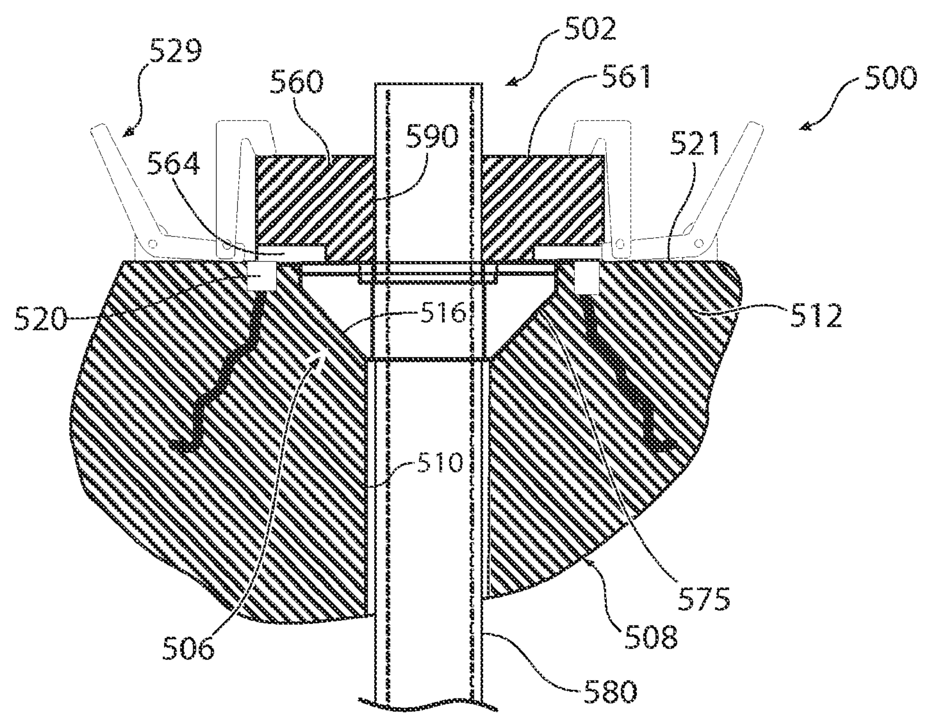
FIG. 16 is a partial cross-sectional view similar to FIG. 15, showing the substance communication coupling system in a latched state.

Referring to FIGS. 14 through 16, a substance communication coupling system 500 according to a sixth embodiment of the invention is shown and is similar to substance communication coupling system 400, described with reference to FIGS. 12 and 13, except as described below.

Substance communication coupling system 500 includes a device substance communication coupling system 502 associated with portable device, not shown, and a host substance communication coupling system 506 associated with a host 508.

Host substance communication coupling system 506 may include a substance line 510 to selectively supply substance from a substance supply, not shown. Substance line 510 terminates in chamfered exposed end 516 for accepting components of device substance communication coupling system 502. Host substance communication coupling system 506 further includes a proximity sensor 520, such as electrical contacts, a pressure pad or any other suitable sensor on outwardly-facing surface 521 of a housing 512 of host 508.

Device substance communication coupling system 502 includes a cap 560 having an aperture 590 therethrough for a substance line 580, and a proximity target 564, such as an electrical conductor, a pressure surface or other suitable feature, for engagement with proximity sensor 520. Substance line 580 extends from a substance consumer, not shown, within the portable device, not shown, for delivery of substance from the host 508 to the substance consumer. Substance line 580 extends through aperture 590 in cap 560 and terminates in a distal end 586. Substance line 580 passes through a seal 575, such as a Swage-Lok™ type seal or a similar flexible seal, between cap 560 and distal end 586 for engagement with chamfered exposed end 516 of substance line 510. Substance line 580 is proportioned so that it may be inserted into substance line 510 in housing 512 of host 508, while seal 575 is proportioned so that it may be partially inserted into chamfered exposed end 516 of substance line 510.

Host substance communication coupling system 506 also includes one or more link systems 529 for selectively engaging a top surface 561 of cap 560 for exerting a downward pressure on cap 560 in a manner to be described shortly herein.

Coupling of a portable device, not shown, to host 508 can be accomplished by first inserting substance line 580 into substance line 510 until seal 575 rests on chamfered exposed end 516 and cap 560 rests on seal 575, as shown in FIG. 15. Next, cap 560 is driven by link systems 529 towards surface outward facing surface 521 of housing 512. The action of link systems 529 on cap 560 drives seal 575 into sealing engagement with chamfered exposed end 516 of substance line 510 and drives proximity target 564 into engagement with proximity sensor 520.

Figure 17:
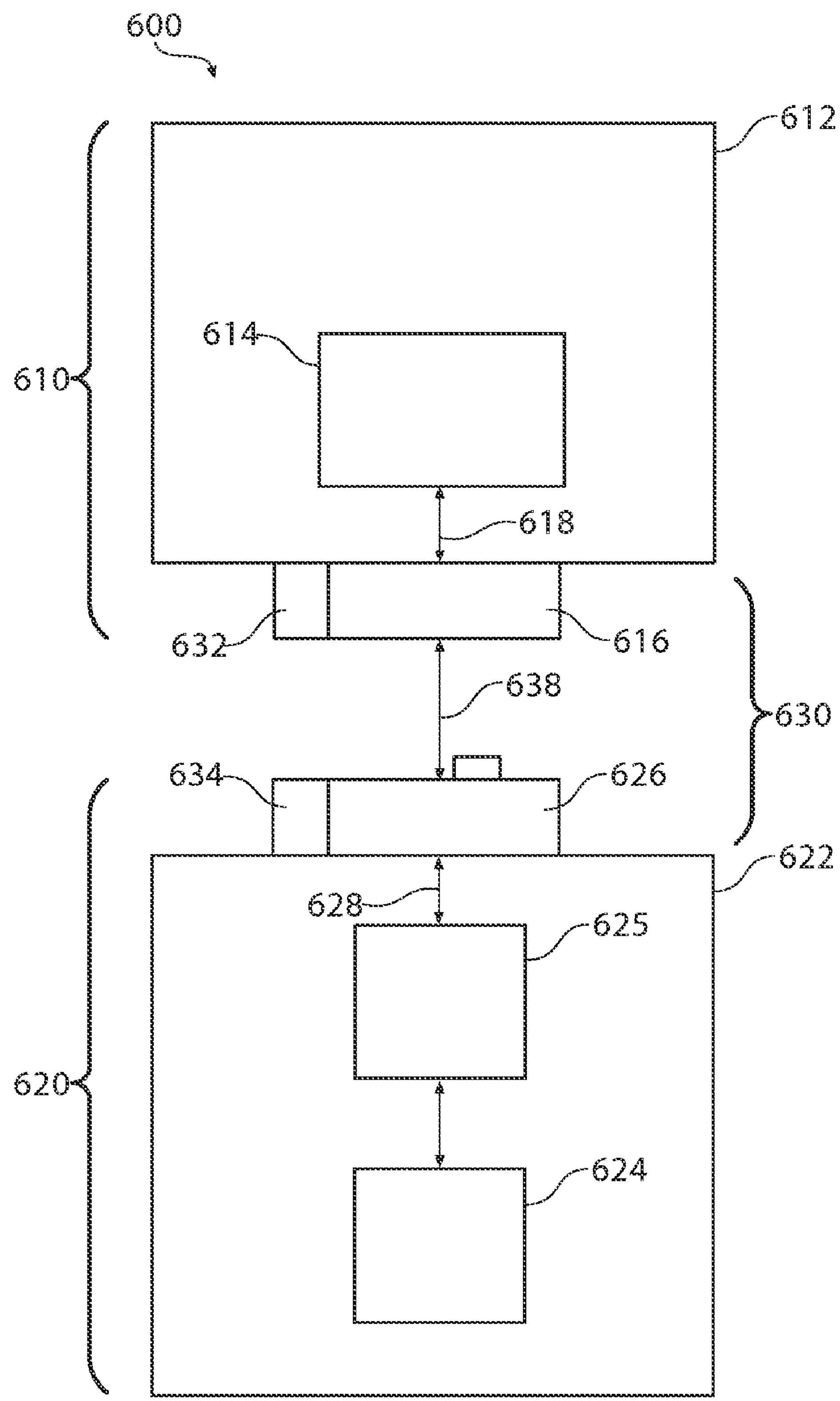
FIG. 17 is a schematic illustration of a substance supply and consumption system.

Referring now to FIG. 17, a more general example of a substance supply and consumption system 600 is schematically illustrated. A first subsystem 610 is connectable to a second subsystem 620 for selectively transferring a substance between the subsystems 610 and 620. As illustrated, first subsystem 610 may include a functional device 612, such as a portable electronic device, including a substance consumer 614 connected to a first substance communication component, such as a plug 616, by a substance communication line 618. Second subsystem 620 may include a host 622, such as a refrigerator, including a substance provider 624 connected to a second substance communication component, such as a receptacle 626, through a switch 625 by substance communication line 628.

A coupler system 630 includes plug 616 and receptacle 626 which are selectively interengageable. Switch components 632 and 634 are respectively associated with the plug 616 and the receptacle 626 to selectively activate the switch 625 when the plug and receptacle are engaged to permit the flow of the substance from the substance provider 624 to the receptacle 626, then along a substance communication line 638 between receptacle 626 and plug 616, and then along substance communication line 618 to substance consumer 614.

It will be appreciated that while host 622 is illustrated as including a substance provider 624 and functional device 612 is illustrated as including a substance consumer, functional device 612 may alternatively or additionally include a substance provider and host 622 may alternatively or additionally include a substance consumer. It will further be appreciated that while plug 616 is illustrated as being associated with substance consumer 614 and receptacle 626 is illustrated as being associated with substance provider 624, it is contemplated that plug 616 and receptacle 618 may be male or female coupler components so long as the components are capable of interengaging to permit the transfer of substance therebetween.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In summary, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A substance communication coupling system comprising:

a first connector component;

a substance switch operably connected to a substance source, the substance switch operable for selectively transferring a substance from the substance source to the first connector component, the substance switch including a first link moveably associated with the substance switch; and a second connector component operably connectable to the first connector component, the second connector component including a second link associated with the second connector component and engageable with the first link of the substance switch;

wherein the substance switch is selectively activated to transfer the substance from the first connector component to the second connector component in response to movement of the first link when engaged with the second link; and wherein the second link is moveable relative to the second connector component between an extended position and a retracted position by movement of the first link when the first link is engaged with the second link, wherein the substance switch is activated to transfer the substance from the substance source to the second connector component when the second link is in the retracted position.

2. The system according to claim 1 and further comprising a substance communication conduit for selectively transferring the substance from the substance source to the first connector component, the substance communication conduit movable between a first position in which the substance communication conduit is operably coupled to the first connector component and a second position in which the substance communication conduit is operably decoupled from the first connector component, wherein the substance communication conduit is arranged in the second position when the second connector component is decoupled from the first connector component.

3. The system according to claim 2 and further comprising a biasing member connected to the substance communication conduit, the biasing member operable for urging the substance communication conduit toward the second position.

4. The system according to claim 1 and further comprising a substance communication conduit for selectively transferring the substance from the substance source to the first connector component, the substance communication conduit connected to the first link for concurrent movement therewith, wherein the substance communication conduit is operably coupled to the first connector component when the second link is in the retracted position.

5. The system according to claim 4, wherein the substance communication conduit is operably decoupled from the first connector component when the second link is in the extended position.

6. The system according to claim 4, wherein the first connector component includes a first end enclosed within a housing and operably engageable with the substance communication conduit, and a second end accessible from outside of the housing.

7. The system according to claim 1, wherein the substance switch is deactivated to substantially block transmission of the substance from the substance source to the first connector component when the first link is detached from the second link.

8. The system according to claim 1, wherein the substance switch is deactivated to substantially block transmission of the substance from the substance source to the first connector component when the second connector component is decoupled from the first connector component.

9. The system according to claim 1 and further comprising a host configured to communicate the substance.

10. The system according to claim 9, wherein the host comprises at least one of a refrigerator, a freezer, a conventional oven, a microwave oven, a dishwashing machine, a stove, a range, an air conditioner, a dehumidifier, a clothes washing machine, a clothes dryer, a clothes refreshing machine, a non-aqueous washing apparatus, a water softener, a water heater, a furnace, pool water treatment equipment, an HVAC system, a thermostat, a blender, a mixer, a toaster, a coffee maker, a trash compactor, an air purifier, an iron, a vacuum cleaner, a robot, and a structural feature of a building.

11. The system according to claim 9 and further comprising a substance consumer configured to communicate the substance with the host.

12. The system according to claim 1, wherein the second link is fixed relative to the second connector component and wherein the substance switch is activated to transfer the substance from the substance source to the second connector component when the second link is engaged with the first link and the first link is moved.

13. The system according to claim 12, wherein the movement of the first link draws the first connector component and second connector component into engagement.

14. The system according to claim 13, wherein the substance switch comprises a proximity switch activated when the first connector component and second connector component are drawn into engagement by the first link.

15. The system according to claim 13, wherein one of the second connector component and first connector component has a proximity target and the other of the second connector component and first connector component has a proximity sensor responsive to the proximity sensor when the first connector component and second connector component are drawn into engagement by the first link.

16. A system for communicating with a substance source, the system comprising:

a first connector component operably engageable with a separate second connector component for transferring a substance from the substance source to the second connector component;

a substance switch for selectively permitting the flow of substance between the first and second connector components, the substance switch including a first link engageable with a second link associated with the second connector component; and a substance communication conduit operably connected to the substance source;

wherein the substance switch is activated to transfer the substance from the substance source to the first connector component in response to movement of the first link;

wherein the first link is moveable between a first position in which the substance communication conduit is operably coupled to the first connector component, and a second position in which the substance communication conduit is operably uncoupled from the first connector component.

17. The system according to claim 16, wherein the first connector component is selectively engageable with the substance communication conduit for transferring the substance from the substance source to the first connector component in response to movement of the first link.

18. The system according to claim 17, wherein the first link is operably connected to the substance communication conduit.

19. The system according to claim 16 and further comprising a biasing member connected to the substance communication conduit for urging the substance communication conduit toward the second position.

20. The system according to claim 16, wherein the first connector component includes a first end enclosed within a housing and selectively engageable with the substance communication conduit, and a second end accessible from outside the housing, the second end being engageable with the second connector component.

21. The system according to claim 16, wherein the substance communication conduit is enclosed within a housing and at least a portion of the first link extends outside of the housing.

22. The system according to claim 16, wherein at least a portion of the first connector component and the first link are accessible from outside a housing enclosing the substance communication conduit.

23. The system according to claim 16, wherein the first position is an extended position and the second position is a retracted position.

24. The system according to claim 16, wherein the substance switch comprises a proximity sensor responsive to a proximity target in the second connector component.

25. A system for communicating with a substance source, the system comprising:

a first connector component operably engageable with a separate second connector component for transferring a substance from the substance source to the second connector component; and a substance switch for selectively permitting the flow of substance between the first and second connector components, the substance switch including a first link engageable with a second link associated with the second connector component;

wherein the substance switch is activated to transfer the substance from the substance source to the first connector component in response to movement of the first link; and wherein the movement of the first link draws the first connector component and second connector component into engagement.

26. The system according to claim 25, wherein the substance switch comprises a proximity switch activated when the first connector component and second connector component are drawn into engagement by the first link.

27. The system according to claim 25, wherein one of the second connector component and first connector component has a proximity target and the other of the second connector component and first connector component has a proximity sensor responsive to the proximity sensor when the first connector component and second connector component are drawn into engagement by the first link.

28. A system for receiving a substance from a host comprising a substance source, the system comprising:

a second connector component operably engageable with a separate first connector component for selectively receiving the substance from the substance source; and an actuator operably associated with the second connector component, the actuator moveable along a path generally parallel to an axis of insertion of the second connector component with the first connector component, between a first position and a second position, wherein the substance is delivered to the second connector component when the actuator is in the first position;

wherein the actuator comprises:

at least one link engageable with a corresponding link associated with the first connector component, the link moveable between an extended position and a retracted position; and a switch operably connected to the at least one link, the switch selectively moveable between a latched position for positioning the at least one link in the retracted position, and an open position for positioning the at least one link in the extended position.

29. The system according to claim 28, wherein the at least one link includes a hook-shaped portion engageable with the first connector component.

30. The system according to claim 28, wherein the at least one link includes a hook-shaped portion engageable with the corresponding link of the first connector component.

31. The system according to claim 28, wherein a longitudinal axis of the at least one link is aligned substantially parallel to the axis of insertion.

32. The system according to claim 28, wherein the at least one link is moveable substantially parallel to a longitudinal axis of the at least one link.

33. The system according to claim 28, wherein the at least one link comprises at least two links and the second connector component is disposed between the at least two links.

34. The system according to claim 28 and further comprising a substance consumer in communication with the second connector component.

35. The system according to claim 34, wherein the substance consumer is at least one of a consumer electronic device, a client software device, a remote user interface, a source of consumer information, a reader, a sensor device, a smart utensil, a portable appliance, an additional smart coupling device, a remote controller, a network binder, a cycle accessory, a resource controller, a communicator, an access system, a payment system, a sales demonstration device, a consumable holder, a dispenser, a filter, a water filter, an air filter, a detergent dispenser, a drink dispenser, a detergent cartridge, a bottle, a jug, a media content holder, and a substance device.

36. The system according to claim 28, wherein the movement of the at least one link draws the first connector component and second connector component into engagement.

37. The system according to claim 36, wherein the switch comprises a proximity switch activated when the first connector component and second connector component are drawn into engagement by the at least one link.

38. The system according to claim 36, wherein one of the second connector component and first connector component has a proximity target and the other of the second connector component and first connector component has a proximity sensor responsive to the proximity sensor when the first connector component and second connector component are drawn into engagement by the at least one link.

39. An adapter for removably coupling an accessory device having a first device substance communication connector component to a host having a substance provider, a first host substance communication connector component, and a substance switch selectively providing a substance to the first device substance communication connector component, the adapter comprising:

a second host substance communication connector component engageable with the first host substance communication connector component;

a second device substance communication connector component engageable with the first device substance communication connector component;

a substance communication line operably interconnecting the second host substance communication connector component and the second device substance communication connector component for the transfer of the substance there along; and a first link engageable with a second link associated with the substance switch;

wherein the substance switch is activated in response to movement of the first link, and wherein the first link engages the second link to actuate the substance switch and cause the second host substance communication coupling system component to engage the first host substance communication connector component to facilitate the flow of substance.

* * * * *